US012594762B2

(12) United States Patent
Kobayashi et al.

(10) Patent No.: US 12,594,762 B2
(45) Date of Patent: Apr. 7, 2026

(54) HEAD UNIT AND LIQUID EJECTING APPARATUS

(71) Applicant: SEIKO EPSON CORPORATION, Tokyo (JP)

(72) Inventors: Wataru Kobayashi, Okaya (JP); Keita Moriyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 159 days.

(21) Appl. No.: 18/660,293

(22) Filed: May 10, 2024

(65) Prior Publication Data

US 2024/0375400 A1 Nov. 14, 2024

(30) Foreign Application Priority Data

May 12, 2023 (JP) ................................ 2023-079195

(51) Int. Cl.
*B41J 2/15* (2006.01)
*B41J 2/14* (2006.01)
*B41J 2/21* (2006.01)

(52) U.S. Cl.
CPC ............. *B41J 2/15* (2013.01); *B41J 2/14201* (2013.01); *B41J 2/2103* (2013.01); *B41J 2/2117* (2013.01)

(58) Field of Classification Search
CPC ........ B41J 2/15; B41J 2/14201; B41J 2/2103; B41J 2/2117; B41J 2002/14362; B41J 2002/14419; B41J 2202/20; B41J 2/14233; B41J 2/2114; B41J 2/01; B41J 2/16552
See application file for complete search history.

(56) References Cited

U.S. PATENT DOCUMENTS

2017/0217217 A1* 8/2017 Miyakoshi ........... B41M 5/0011
2020/0207088 A1* 7/2020 Munakata ............ B41J 2/14233

FOREIGN PATENT DOCUMENTS

JP 2020-104387 A 7/2020

* cited by examiner

*Primary Examiner* — Lisa Solomon
(74) *Attorney, Agent, or Firm* — WORKMAN NYDEGGER

(57) ABSTRACT

Each of a liquid ejecting head H1 and a liquid ejecting head H2 includes a plurality of head chips Hc. A first distance D1 is a distance between a nozzle row L1*a* disposed at an end in a +Y direction and a nozzle row L4*b* disposed at an end in a −Y direction. A second distance D2 between the nozzle row L4*b* and a nozzle row L5*a* is longer than the first distance D1. The liquid ejecting head H1 includes a plurality of head chips Hc1 to Hc4 having nozzle rows L for ejecting a first liquid. The liquid ejecting head H2 includes a head chip Hc8 having nozzle rows L8*a* and L8*b* for ejecting a reaction liquid and a head chip Hc5 having nozzle rows La and L5*b* for ejecting a treatment liquid.

13 Claims, 19 Drawing Sheets

FIG. 9 tal

| LIQUID EJECTING HEAD | HEAD CHIP | NOZZLE ROW | LIQUID |
|---|---|---|---|
| H 1 | Hc1 | L 1 a | OVERCOAT LIQUID |
| | | L 1 b | CYAN |
| | Hc2 | L 2 a | ORANGE |
| | | L 2 b | RED |
| | Hc3 | L 3 a | GREEN |
| | | L 3 b | YELLOW |
| | Hc4 | L 4 a | MAGENTA |
| | | L 4 b | BLACK |
| H 2 | Hc5 | L 5 a | TREATMENT LIQUID |
| | | L 5 b | TREATMENT LIQUID |
| | Hc6 | L 6 a | UNUSED |
| | | L 6 b | UNUSED |
| | Hc7 | L 7 a | UNUSED |
| | | L 7 b | UNUSED |
| | Hc8 | L 8 a | REACTION LIQUID |
| | | L 8 b | REACTION LIQUID |

FIG. 10 ta2

| LIQUID EJECTING HEAD | HEAD CHIP | NOZZLE ROW | LIQUID |
|---|---|---|---|
| H 1 | Hc1 | L 1 a | CYAN |
| | | L 1 b | ORANGE |
| | Hc2 | L 2 a | RED |
| | | L 2 b | GREEN |
| | Hc3 | L 3 a | YELLOW |
| | | L 3 b | MAGENTA |
| | Hc4 | L 4 a | BLACK |
| | | L 4 b | OVERCOAT LIQUID |
| H 2 | Hc5 | L 5 a | TREATMENT LIQUID |
| | | L 5 b | TREATMENT LIQUID |
| | Hc6 | L 6 a | UNUSED |
| | | L 6 b | UNUSED |
| | Hc7 | L 7 a | UNUSED |
| | | L 7 b | UNUSED |
| | Hc8 | L 8 a | REACTION LIQUID |
| | | L 8 b | REACTION LIQUID |

FIG. 11 ta3

| LIQUID EJECTING HEAD | HEAD CHIP | NOZZLE ROW | LIQUID |
|---|---|---|---|
| H 1 | Hc1 | L 1 a | OVERCOAT LIQUID |
| | | L 1 b | CYAN |
| | Hc2 | L 2 a | ORANGE |
| | | L 2 b | RED |
| | Hc3 | L 3 a | GREEN |
| | | L 3 b | YELLOW |
| | Hc4 | L 4 a | MAGENTA |
| | | L 4 b | BLACK |
| H 2 | Hc5 | L 5 a | TREATMENT LIQUID |
| | | L 5 b | TREATMENT LIQUID |
| | Hc6 | L 6 a | TREATMENT LIQUID |
| | | L 6 b | TREATMENT LIQUID |
| | Hc7 | L 7 a | REACTION LIQUID |
| | | L 7 b | REACTION LIQUID |
| | Hc8 | L 8 a | REACTION LIQUID |
| | | L 8 b | REACTION LIQUID |

FIG. 12 ta4

| LIQUID EJECTING HEAD | HEAD CHIP | NOZZLE ROW | LIQUID |
|---|---|---|---|
| H 1 | Hc1 | L 1 a | OVERCOAT LIQUID |
| | | L 1 b | CYAN |
| | Hc2 | L 2 a | ORANGE |
| | | L 2 b | RED |
| | Hc3 | L 3 a | GREEN |
| | | L 3 b | YELLOW |
| | Hc4 | L 4 a | MAGENTA |
| | | L 4 b | BLACK |
| H 2 | Hc5 | L 5 a | TREATMENT LIQUID |
| | | L 5 b | TREATMENT LIQUID |
| | Hc6 | L 6 a | REACTION LIQUID |
| | | L 6 b | REACTION LIQUID |
| | Hc7 | L 7 a | REACTION LIQUID |
| | | L 7 b | REACTION LIQUID |
| | Hc8 | L 8 a | TREATMENT LIQUID |
| | | L 8 b | TREATMENT LIQUID |

FIG. 13 ta5

| LIQUID EJECTING HEAD | HEAD CHIP | NOZZLE ROW | LIQUID |
|---|---|---|---|
| H 1 | Hc1 | L 1 a | OVERCOAT LIQUID |
| | | L 1 b | CYAN |
| | Hc2 | L 2 a | ORANGE |
| | | L 2 b | RED |
| | Hc3 | L 3 a | GREEN |
| | | L 3 b | YELLOW |
| | Hc4 | L 4 a | MAGENTA |
| | | L 4 b | BLACK |
| H 2 | Hc5 | L 5 a | REACTION LIQUID |
| | | L 5 b | REACTION LIQUID |
| | Hc6 | L 6 a | TREATMENT LIQUID |
| | | L 6 b | TREATMENT LIQUID |
| | Hc7 | L 7 a | TREATMENT LIQUID |
| | | L 7 b | TREATMENT LIQUID |
| | Hc8 | L 8 a | REACTION LIQUID |
| | | L 8 b | REACTION LIQUID |

FIG. 14 ta6

| LIQUID EJECTING HEAD | HEAD CHIP | NOZZLE ROW | LIQUID |
|---|---|---|---|
| H 1 | Hc1 | L 1 a | OVERCOAT LIQUID |
| | | L 1 b | CYAN |
| | Hc2 | L 2 a | ORANGE |
| | | L 2 b | RED |
| | Hc3 | L 3 a | GREEN |
| | | L 3 b | YELLOW |
| | Hc4 | L 4 a | MAGENTA |
| | | L 4 b | BLACK |
| H 2 | Hc5 | L 5 a | REACTION LIQUID |
| | | L 5 b | REACTION LIQUID |
| | Hc6 | L 6 a | UNUSED |
| | | L 6 b | UNUSED |
| | Hc7 | L 7 a | UNUSED |
| | | L 7 b | UNUSED |
| | Hc8 | L 8 a | TREATMENT LIQUID |
| | | L 8 b | TREATMENT LIQUID |

FIG. 15 ta7

| LIQUID EJECTING HEAD | HEAD CHIP | NOZZLE ROW | LIQUID |
|---|---|---|---|
| H 1 | Hc1 | L 1 a | OVERCOAT LIQUID |
| | | L 1 b | CYAN |
| | Hc2 | L 2 a | ORANGE |
| | | L 2 b | RED |
| | Hc3 | L 3 a | GREEN |
| | | L 3 b | YELLOW |
| | Hc4 | L 4 a | MAGENTA |
| | | L 4 b | BLACK |
| H 2 | Hc5 | L 5 a | UNUSED |
| | | L 5 b | UNUSED |
| | Hc6 | L 6 a | TREATMENT LIQUID |
| | | L 6 b | TREATMENT LIQUID |
| | Hc7 | L 7 a | REACTION LIQUID |
| | | L 7 b | REACTION LIQUID |
| | Hc8 | L 8 a | UNUSED |
| | | L 8 b | UNUSED |

FIG. 16 ta8

| LIQUID EJECTING HEAD | HEAD CHIP | NOZZLE ROW | LIQUID |
|---|---|---|---|
| H 1 | Hc1 | L 1 a | OVERCOAT LIQUID |
| | | L 1 b | CYAN |
| | Hc2 | L 2 a | ORANGE |
| | | L 2 b | RED |
| | Hc3 | L 3 a | GREEN |
| | | L 3 b | YELLOW |
| | Hc4 | L 4 a | MAGENTA |
| | | L 4 b | BLACK |
| H 2 | Hc5 | L 5 a | REACTION LIQUID |
| | | L 5 b | TREATMENT LIQUID |
| | Hc6 | L 6 a | UNUSED |
| | | L 6 b | UNUSED |
| | Hc7 | L 7 a | UNUSED |
| | | L 7 b | UNUSED |
| | Hc8 | L 8 a | TREATMENT LIQUID |
| | | L 8 b | REACTION LIQUID |

FIG. 17 ta9

| LIQUID EJECTING HEAD | HEAD CHIP | NOZZLE ROW | LIQUID |
|---|---|---|---|
| H 1 | Hc1 | L 1 a | TREATMENT LIQUID |
| | | L 1 b | TREATMENT LIQUID |
| | Hc2 | L 2 a | OVERCOAT LIQUID |
| | | L 2 b | CYAN |
| | Hc3 | L 3 a | ORANGE |
| | | L 3 b | RED |
| | Hc4 | L 4 a | GREEN |
| | | L 4 b | YELLOW |
| H 2 | Hc5 | L 5 a | MAGENTA |
| | | L 5 b | BLACK |
| | Hc6 | L 6 a | UNUSED |
| | | L 6 b | UNUSED |
| | Hc7 | L 7 a | UNUSED |
| | | L 7 b | UNUSED |
| | Hc8 | L 8 a | REACTION LIQUID |
| | | L 8 b | REACTION LIQUID |

FIG. 19 ta10

| LIQUID EJECTING HEAD | HEAD CHIP | NOZZLE ROW | LIQUID |
|---|---|---|---|
| H 1 | Hc1 | L1a | OVERCOAT LIQUID |
| | | L1b | CYAN |
| | Hc2 | L2a | ORANGE |
| | | L2b | RED |
| | Hc3 | L3a | GREEN |
| | | L3b | YELLOW |
| | Hc4 | L4a | MAGENTA |
| | | L4b | BLACK |
| H 2 | Hc5 | L5a | TREATMENT LIQUID |
| | | L5b | TREATMENT LIQUID |
| | Hc6 | L6a | REACTION LIQUID |
| | | L6b | REACTION LIQUID |
| | Hc7 | L7a | REACTION LIQUID |
| | | L7b | REACTION LIQUID |
| | Hc8 | L8a | TREATMENT LIQUID |
| | | L8b | TREATMENT LIQUID |
| H 3 | Hc9 | L9a | BLACK |
| | | L9b | MAGENTA |
| | Hc10 | L10a | YELLOW |
| | | L10b | GREEN |
| | Hc11 | L11a | RED |
| | | L11b | ORANGE |
| | Hc12 | L12a | CYAN |
| | | L12b | OVERCOAT LIQUID |

HEAD UNIT AND LIQUID EJECTING APPARATUS

The present application is based on, and claims priority from JP Application Serial Number 2023-079195, filed May 12, 2023, the disclosure of which is hereby incorporated by reference herein in its entirety.

BACKGROUND

1. Technical Field

The present disclosure relates to a head unit and liquid ejecting apparatus that eject a liquid.

2. Related Art

In the related art, there are disclosed a head unit including a liquid ejecting head that ejects a liquid and a liquid ejecting head that ejects a reaction liquid containing an aggregating agent for aggregating the liquid, in order to improve fixability of an ink to a medium. For example, JP-A-2020-104387 discloses a head unit in which a precoat head that ejects a precoat liquid, which is an example of a reaction liquid, and an ink head that ejects an ink are disposed such that a disposition distance between the precoat head and the ink head is larger than a disposition distance between a plurality of ink heads. By disposing the precoat head and the ink head in this manner, a probability that the mist generated when the precoat liquid is ejected from the precoat head adheres to nozzles of the ink head and thus nozzle clogging occurs is reduced.

However, in order to reduce the occurrence of the nozzle clogging caused by mist, it is necessary to prepare a liquid ejecting head that ejects only the reaction liquid and is dedicated to the reaction liquid, whereby the number of liquid ejecting heads increases and the head unit increases in size.

SUMMARY

According to an aspect of the present disclosure, there is provided a liquid ejecting head that ejects a first liquid, a reaction liquid that aggregates the first liquid, and a treatment liquid that is less likely to aggregate with the reaction liquid than the first liquid. The head unit includes a plurality of liquid ejecting heads disposed to be arranged in a first direction. Each of the plurality of liquid ejecting heads includes a plurality of head chips having one or more nozzle rows. A first distance is a distance in the first direction between a nozzle row disposed at an end in the first direction and a nozzle row disposed at an end in a second direction opposite to the first direction among a plurality of the nozzle rows in the liquid ejecting head. The plurality of liquid ejecting heads include a first head and a second head adjacent to each other. A second distance in the first direction between a nozzle row closest to the second head among a plurality of the nozzle rows in the first head and a nozzle row closest to the first head among a plurality of the nozzle rows in the second head is longer than the first distance. The first head includes a plurality of first head chips having one or more first nozzle rows for ejecting the first liquid. The second head includes one or more second head chips having one or more second nozzle rows for ejecting the reaction liquid and one or more third head chips having one or more third nozzle rows for ejecting the treatment liquid.

According to another aspect of the present disclosure, there is provided a liquid ejecting apparatus including the head unit according to the above aspect, and a moving mechanism that reciprocates the head unit in the first direction and the second direction.

BRIEF DESCRIPTION OF THE DRAWINGS

FIG. 9 is a table showing a relationship between each nozzle row and an ejected liquid, according to the first embodiment of the present disclosure.

FIG. 10 is a table showing a relationship between each nozzle row and an ejected liquid, according to a first modification example of the first embodiment of the present disclosure.

FIG. 11 is a table showing a relationship between each nozzle row and an ejected liquid, according to a second modification example of the first embodiment of the present disclosure.

FIG. 12 is a table showing a relationship between each nozzle row and an ejected liquid, according to a third modification example of the first embodiment of the present disclosure.

FIG. 13 is a table showing a relationship between each nozzle row and an ejected liquid, according to a fourth modification example of the first embodiment of the present disclosure.

FIG. 14 is a table showing a relationship between each nozzle row and an ejected liquid, according to a fifth modification example of the first embodiment of the present disclosure.

FIG. 15 is a table showing a relationship between each nozzle row and an ejected liquid, according to a sixth modification example of the first embodiment of the present disclosure.

FIG. 16 is a table showing a relationship between each nozzle row and an ejected liquid according to a first comparative example.

FIG. 17 is a table showing a relationship between each nozzle row and an ejected liquid according to a second comparative example.

FIG. 19 is a table showing a relationship between each nozzle row and an ejected liquid, according to the second embodiment of the present disclosure.

DESCRIPTION OF EMBODIMENTS

Hereinafter, the present disclosure will be described in detail based on embodiments. However, the following description illustrates an aspect of the present disclosure, and can be freely changed within the scope of the present disclosure. Those having the same reference signs in each of the drawings indicate the same members, and the description thereof is omitted as appropriate. In each of the drawings, X, Y, and Z represent three spatial axes perpendicular to each other. In the present specification, directions along these axes are set as an X-direction, a Y-direction, and a Z-direction. A direction where the arrow in each of the drawings is directed is a positive (+) direction, and a direction opposite to the arrow is a negative (−) direction. In addition, the directions of the three spatial axes that do not limit the positive direction and the negative direction will be described as an X-axis direction, a Y-axis direction, and a Z-axis direction.

First Embodiment

Figure 1:
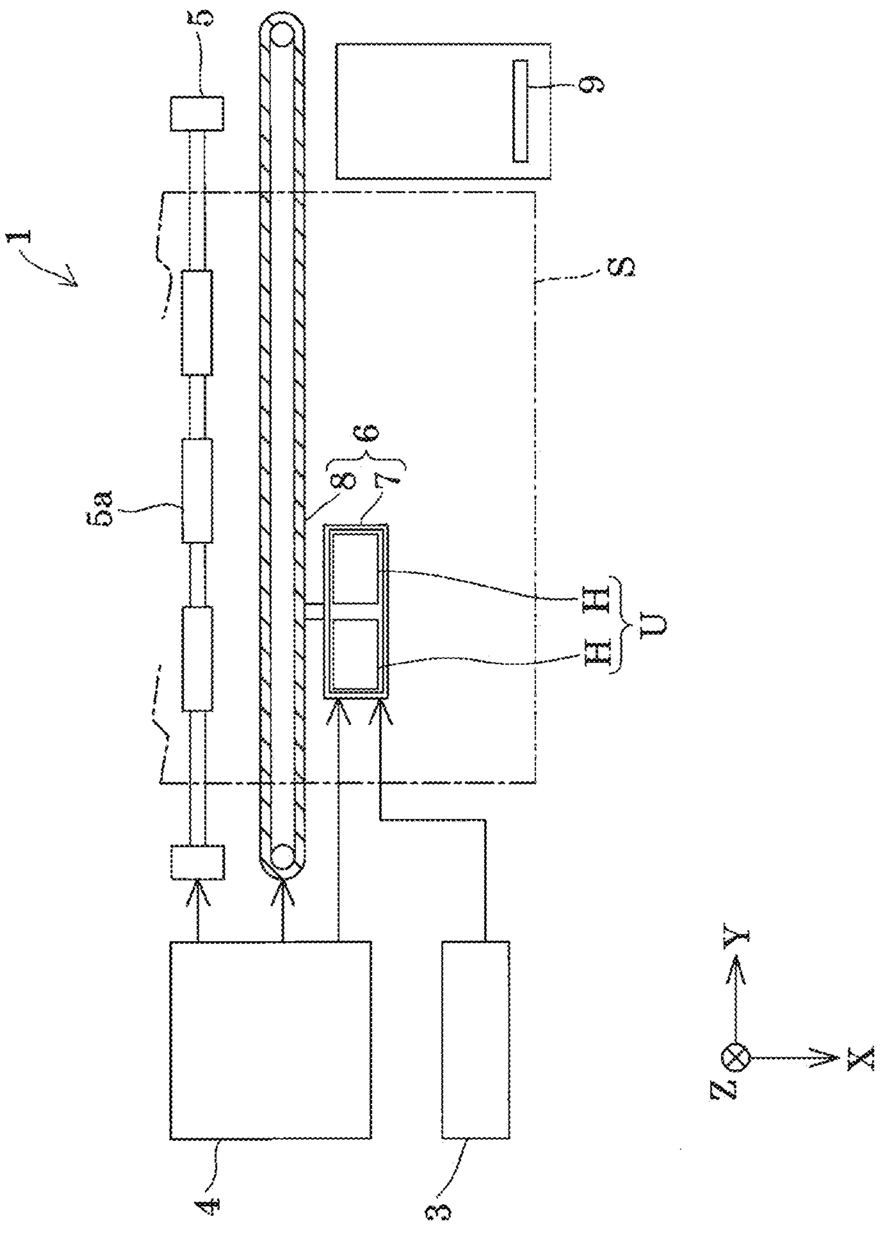
FIG. 1 is a view illustrating a schematic configuration of a liquid ejecting apparatus according to a first embodiment of the present disclosure.

FIG. 1 is a view illustrating a schematic configuration of a liquid ejecting apparatus 1 according to a first embodiment of the present disclosure.

As illustrated in FIG. 1, the liquid ejecting apparatus 1 includes a head unit U including a plurality of liquid ejecting heads H. The liquid ejecting apparatus 1 is a so-called serial type printer that performs printing by transporting a medium S in the X-axis direction and ejecting a liquid from the liquid ejecting head H to the medium S in the +Z direction while reciprocating the head unit U in the Y-axis direction. As the medium S, any material such as recording paper or a resin film can be used in addition to cloth.

Examples of the liquid ejected by the liquid ejecting apparatus 1 include an ink containing a coloring material, a reaction liquid containing an aggregating agent for aggregating the ink, a treatment liquid containing a softening agent, and a post-treatment liquid. The ink in the present embodiment is a liquid having some coloring materials such as dyes and pigments. Examples of the pigment used as the coloring material include inorganic pigments such as carbon used for a black ink, titanium oxide used for a white ink, and alumina used for a silver metallic ink.

By ejecting the reaction liquid to a medium S, and then ejecting the ink to a position at which the reaction liquid lands on the medium S, the reaction liquid and the ink are mixed on the medium S or at a position where the ink permeates into the medium S and the reaction liquid aggregates with the ink. Thus, it is possible to improve the fixability of the ink on the medium S. The reaction liquid may be ejected to a position at which the ink lands on the medium S, during a predetermined period after the ink is ejected to the medium S. The predetermined period is, for example, a period of one pass, which will be described later.

The reaction liquid is a liquid containing the aggregating agent for aggregating the ink. An organic acid may be contained as an aggregating agent for aggregating a coloring material. As the reaction liquid containing the organic acid, a reaction liquid containing at least a glutaric acid, a solvent, and an activator can be adopted, and a reaction liquid containing an organic acid such as citric acid, malic acid, and malonic acid can be used.

Examples of a specific combination of the reaction liquid and the ink include two combinations as follows. The first combination is a reaction liquid having a basic polymer as the aggregating agent and an ink containing an anionic dye. The second combination is a reaction liquid containing an organic compound having two or more cationic groups per molecule as the aggregating agent, and an ink containing an anionic dye. The combination of the reaction liquid and the ink is not limited to the above two combinations.

The post-treatment liquid is an overcoat liquid that covers the ink containing a coloring material, which has been landed on the medium S. The post-treatment liquid is a liquid that does not have the coloring material, and improves the fixability of the ink ejected onto the medium S. The post-treatment liquid is also aggregated by the reaction liquid.

The treatment liquid is a liquid containing a softening agent that imparts flexibility to the medium S. The treatment liquid is, for example, silicone oil containing dimethyl silicone, amino-modified silicone (weak anionic), and ether silicone as main components. As another example, the treatment liquid may be a liquid containing either a cationic surfactant or polyester (nonionic) as the main component. By applying the softening agent, it is possible to improve the flexibility, water resistance, and color developing properties of the medium S. The flexibility by the softening agent means a flexible effect obtained by adhering the softening agent to fiber to impart slidability and reduce the friction between threads of fibers. The water resistance by the softening agent means water repellency (water resistance) obtained by the properties of the softening agent, because the softening agent has low surface tension and has properties close to oil. The color developing property by the softening agent means a glossing (darkening) effect obtained by lowering the refractive index by coating the medium S. The treatment liquid is less likely to aggregate with the reaction liquid than the ink containing the coloring material. For example, the ink or the post-treatment liquid reacts instantaneously with the reaction liquid, but the treatment liquid does not instantaneously react with the reaction liquid. For example, the reaction time until the reaction between the ink and the reaction liquid is completed is only about several seconds. In the present embodiment, it takes 24 hours or longer to form an aggregate by completing the reaction between the treatment liquid and the reaction liquid. Thus, the phrase "less likely to aggregate" means that it takes at least five minutes or longer to complete the reaction, preferably one hour or longer, and more preferably four hours or longer. The phrase "less likely to aggregate" may include a case where the time from the contact with the reaction liquid to the completion of the reaction is longer than an interval of cleaning that is periodically performed. The cleaning that is periodically performed may mean that a wiping member 9, which will be described in detail later, periodically wipes each ejection surface 120 of the head unit U. The interval of the cleaning may be an interval at which so-called suction cleaning for discharging the liquid from a nozzle 21 by applying negative pressure to the nozzle 21 by a cap (not illustrated) is periodically performed, or may be an interval at which so-called pressurization cleaning of discharging the liquid from the nozzle 21 by pressurizing a flow path on an upstream of a pressure chamber 12 is periodically performed.

Such a liquid ejecting apparatus 1 includes the head unit U, a liquid storage section 3, a control unit 4 that is a controller, a transport mechanism 5 that feeds out a medium S, and a moving mechanism 6.

The head unit U includes a plurality of liquid ejecting heads H disposed to be arranged in the Y-direction and a support U1 (see FIG. 2) that supports the plurality of liquid ejecting heads H. In the present embodiment, two liquid ejecting heads H are supported by one common support U1. The plurality of liquid ejecting heads H may be supported by the support U1 divided into two pieces or more, but the head unit U is defined by the support U1, and thus the number of the support U1 corresponds to the number of head units U.

The liquid ejecting head H ejects a liquid supplied from the liquid storage section 3 that stores the liquid as droplets in the +Z direction.

The liquid storage section 3 individually stores a plurality of types of liquids that have different colors or different components and are ejected from the liquid ejecting head H. Examples of the liquid storage section 3 include a cartridge that can be attached to and detached from the liquid ejecting apparatus 1, a bag-shaped ink pack formed of a flexible film, an ink tank that can be refilled with ink, and the like. FIG. 1 illustrates one liquid storage section 3. The liquid storage section 3 may be a liquid storage section 3 having divided rooms for individually storing a plurality of types of liquids, and may be a plurality of liquid storage sections 3 individually provided according to a plurality of types of liquids. Further, the liquid storage section 3 may be divided into a main tank and a sub tank. The sub tank may be coupled to the liquid ejecting head H, and the sub tank is refilled with the liquid consumed by ejecting the droplets from the liquid ejecting head H from the main tank.

As illustrated in FIG. 1, the control unit 4 includes a control device such as a central processing unit (CPU) or a field programmable gate array (FPGA), and a storage device such as a semiconductor memory. The control unit 4 is electrically coupled to the liquid ejecting head H via an external wiring (not illustrated). The control unit 4 totally controls each element of the liquid ejecting apparatus 1, that is, the liquid ejecting head H, the transport mechanism 5, the moving mechanism 6, and the like by executing the program stored in the storage device by the control device.

The transport mechanism 5 transports the medium S in the X-axis direction, and has a transport roller 5*a*. That is, the transport mechanism 5 transports the medium S in the X-axis direction by rotating the transport roller 5*a*. The transport roller 5*a* is rotated by driving a transport motor (not illustrated). The control unit 4 controls the transport of the medium S by controlling the drive of the medium transport motor. The transport mechanism 5 that transports the medium S is not limited to the one including the transport roller 5*a*, and may transport the medium S by a belt or a drum.

The moving mechanism 6 is a mechanism for reciprocating the head unit U in the Y-axis direction, and includes a holding member 7 and a transport belt 8. The holding member 7 is a so-called carriage that holds the head unit U, and is fixed to the transport belt 8. The transport belt 8 is an endless belt erected along the Y-axis direction. The transport belt 8 is rotated by driving a transport motor (not illustrated). The control unit 4 rotates the transport belt 8 by controlling the drive of the transport motor to reciprocate the head unit U together with the holding member 7 in the Y-axis direction.

Figure 4:
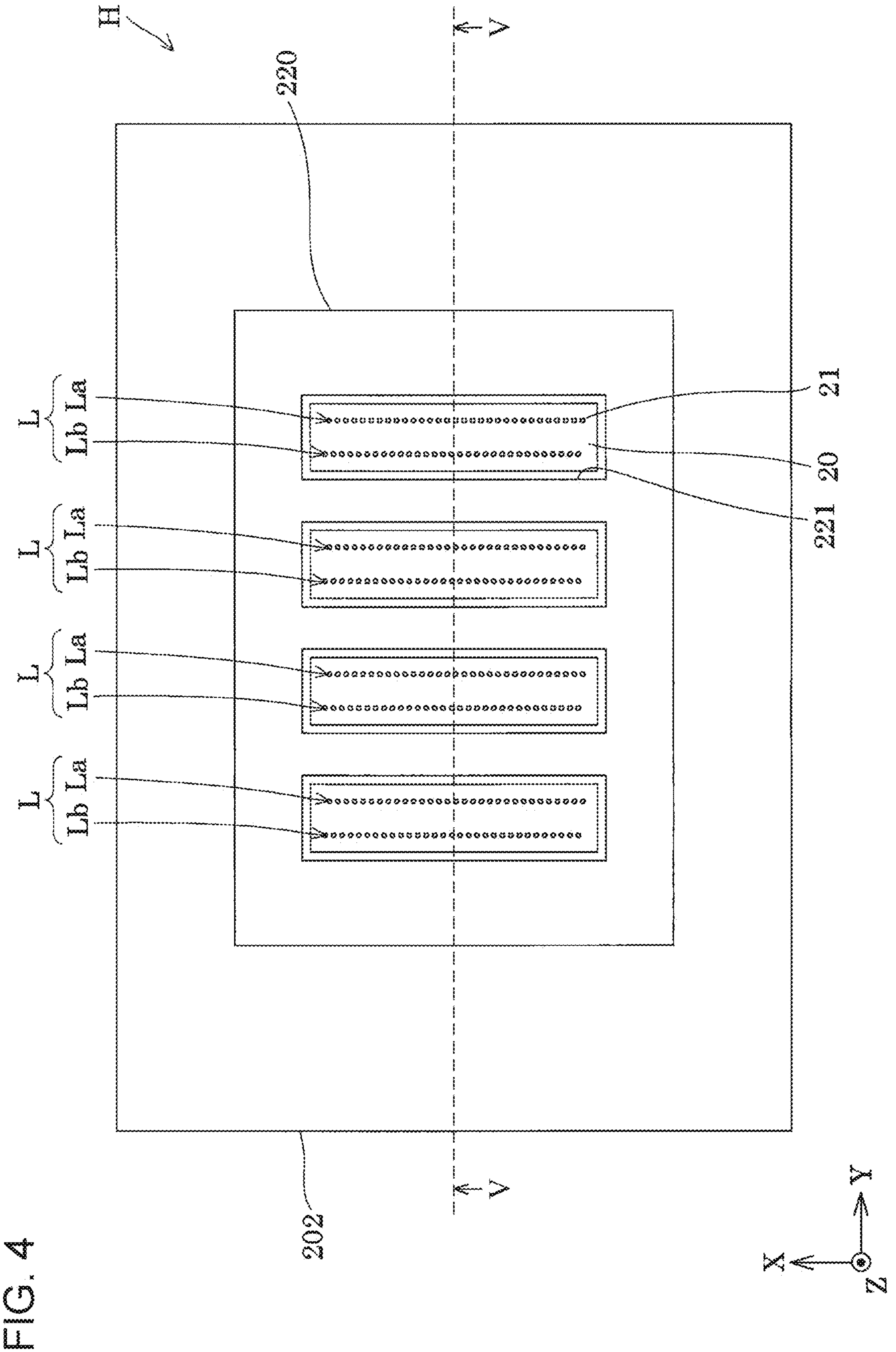
FIG. 4 is a plan view of the liquid ejecting head according to the first embodiment of the present disclosure.

Under the control of the control unit 4, the plurality of liquid ejecting heads H mounted on the head unit U performs an ejection operation of ejecting the liquid supplied from the liquid storage section 3 in the +Z direction as droplets from each of a plurality of nozzles 21 (see FIG. 4). The ejection operation by the liquid ejecting head H is performed in parallel with the transporting of the medium S by the transport mechanism 5 and the reciprocating movement of the liquid ejecting head H by the moving mechanism 6, so that so-called printing in which the liquid is applied to the medium S is performed.

A printing process has two modes, bidirectional printing and unidirectional printing. Moving the head unit U once in the Y-axis direction is referred to as one pass. The period of one pass is a period required to move the head unit U once in the Y-axis direction. In the bidirectional printing, the liquid ejecting apparatus 1 executes a +Y direction printing process of ejecting the liquid while moving the head unit U in the +Y direction to form a partial image corresponding to a band width corresponding to a first pass on the medium S. Then, the liquid ejecting apparatus 1 executes a moving process of moving the medium S in the X-axis direction by the band width and executes a −Y direction printing process of ejecting the liquid while moving the head unit U in the −Y direction to form a partial image corresponding to a band width corresponding to a second pass on the medium S. Thereafter, the liquid ejecting apparatus 1 repeats the +Y direction printing process and the −Y direction printing process until an image is formed at the medium S. In the bidirectional printing, the moving process may be executed after the +Y direction printing process and the −Y direction printing process are executed. The moving process may be executed after each of the +Y direction printing process and the −Y direction printing process is executed a plurality of times. The bidirectional printing can shorten the time required for forming an image on the medium S as compared with unidirectional printing.

In unidirectional printing, the +Y direction printing process described above is executed. In the unidirectional printing, a partial image corresponding to the band width corresponding to the first pass may be formed by executing the +Y direction printing process a plurality of times. When the +Y direction printing process is ended, the moving process of moving the head unit U in the −X direction side of the medium S is executed without ejecting the liquid. After a partial image is formed by repeating such a +Y direction printing process once or a plurality of times, the medium S is moved in the X-axis direction by the band width. Thereafter, the liquid ejecting apparatus 1 repeats the +Y direction printing process and the moving process until an image is formed at the medium S. The unidirectional printing may be executed by executing the −Y direction printing process instead of the +Y direction printing process. That is, in the unidirectional printing, the −Y direction printing process and the moving process may be repeated.

The liquid ejecting apparatus 1 includes the wiping member 9 that wipes an ejection surface 120 of the liquid ejecting head H. As the wiping member 9, for example, a plate-shaped blade formed of an elastic material such as rubber, a porous material such as a woven fabric, a non-woven fabric, and a sponge can be used. The wiping member 9 wipes the ejection surface in the X-axis direction by moving in the X-axis direction relative to the ejection surface of the liquid ejecting head H, which will be described in detail later. The relative movement in the X-axis direction between the liquid ejecting head H and the wiping member 9 may be performed by moving the liquid ejecting head H, may be performed by moving the wiping member 9, or may be performed by moving both of the liquid ejecting head H and the wiping member 9. In the present embodiment, the wiping member 9 wipes each ejection surface 120 of the liquid ejecting head H by relatively moving in the −X direction with respect to the head unit U.

Although not particularly illustrated, the wiping member 9 may be independently provided for each liquid ejecting head H arranged in the Y-axis direction, or may be continuously provided over a head group including a plurality of liquid ejecting heads H arranged in the Y-axis direction. In the present embodiment, the wiping member 9 has a size which is continuous over the maximum number of liquid ejecting heads H arranged in the X-axis direction, that is, over two liquid ejecting heads H (to be described in detail later). Therefore, the ejection surfaces 120 of the two liquid ejecting heads H arranged in the Y-axis direction can be wiped in a manner that the wiping member 9 relatively moves in the −X direction with respect to the head unit U.

The wiping member 9 may have a structure of normally wiping the ejection surface with a surface of a new wiping member 9 by wiping the ejection surface using a woven fabric or a non-woven fabric wound around a roller, and then winding a used portion of the wiping member 9.

Figure 2:
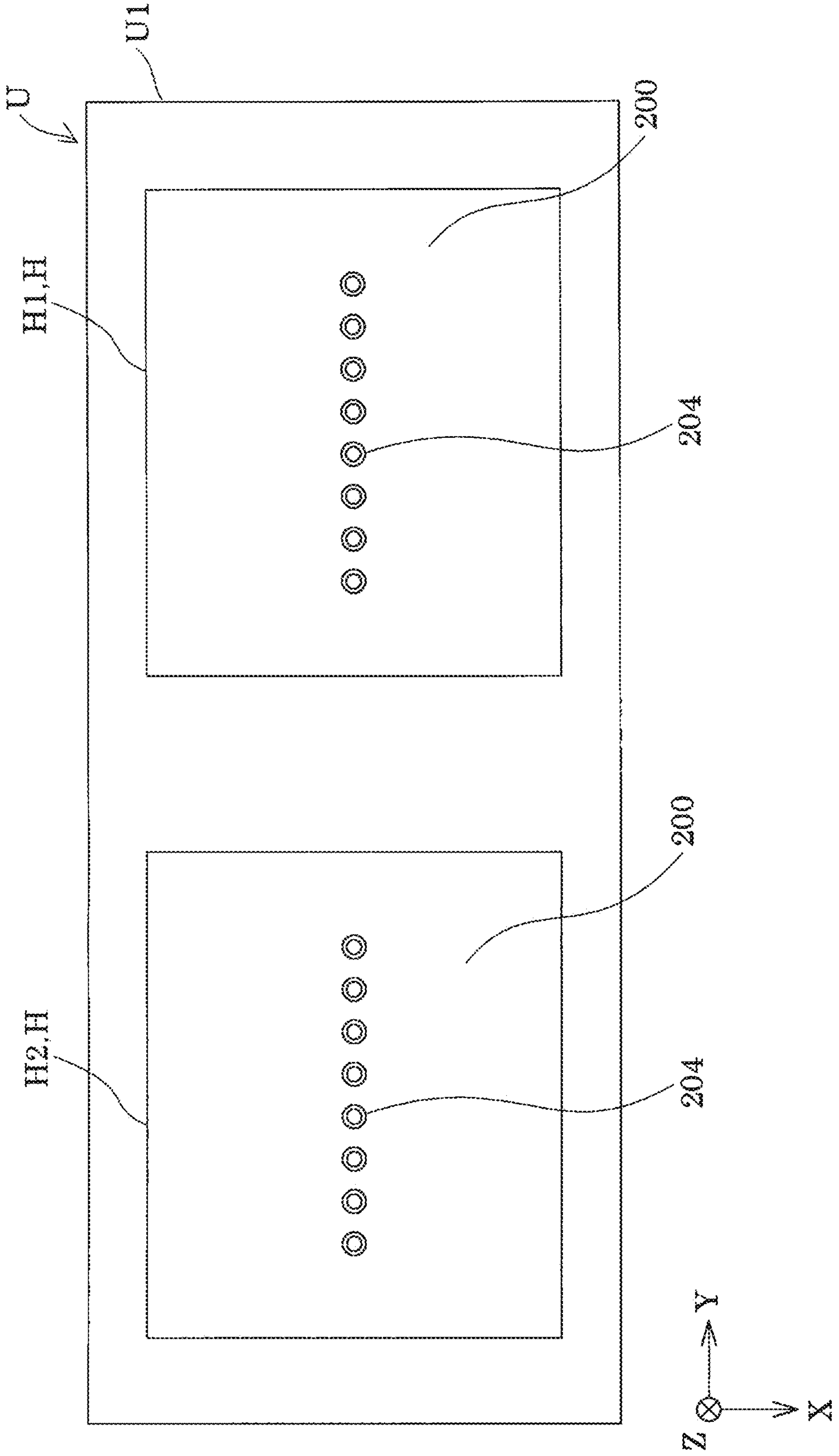
FIG. 2 is a plan view of a head unit according to the first embodiment of the present disclosure.

FIG. 2 is a plan view of the head unit U according to the first embodiment of the present disclosure. Each direction of the head unit U will be described in accordance with the direction when the head unit U is mounted on the liquid ejecting apparatus 1, that is, the X-axis direction, the Y-axis direction, and the Z-axis direction.

The head unit U includes a plurality of liquid ejecting heads H and a support U1 that commonly supports the plurality of liquid ejecting heads H. In the present embodiment, the head unit U includes a liquid ejecting head H1 disposed on the +Y direction side and a liquid ejecting head H2 disposed on the −Y direction side. When the liquid ejecting head H1 and the liquid ejecting head H2 are not distinguished from each other, the liquid ejecting head H1 and the liquid ejecting head H2 are referred to as the liquid ejecting head H. In the present embodiment, the head unit U includes two liquid ejecting heads H, but the number of the head units U is not limited to two. That is, any plurality of liquid ejecting heads H may be disposed in the head unit U. The liquid ejecting head H1 and the liquid ejecting head H2 are adjacent to each other. When the head unit U includes three or more liquid ejecting heads H, two liquid ejecting heads adjacent to each other among the plurality of liquid ejecting heads H are the liquid ejecting head H1 and the liquid ejecting head H2.

The support U1 is formed of a plate-shaped member formed of a metal material or a resin material, and is provided with a plurality of attachment holes (not illustrated) for supporting the liquid ejecting head H. The plurality of liquid ejecting heads H are supported by the support U1 in a state of being inserted into the attachment holes. The disposition of the liquid ejecting heads H supported by the support U1 will be described later in detail.

Figure 3:
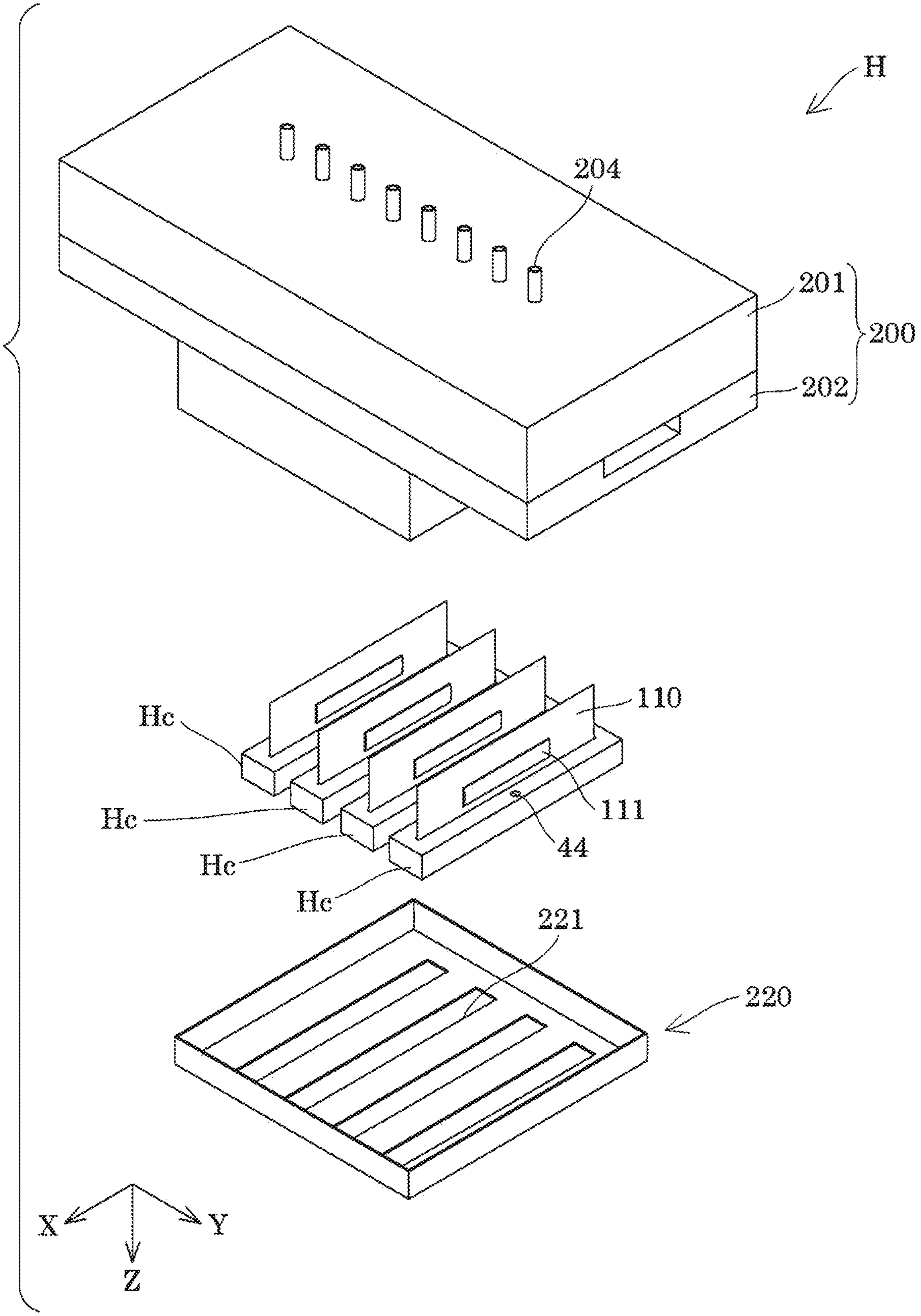
FIG. 3 is an exploded perspective view of a liquid ejecting head according to the first embodiment of the present disclosure.
Figure 5:
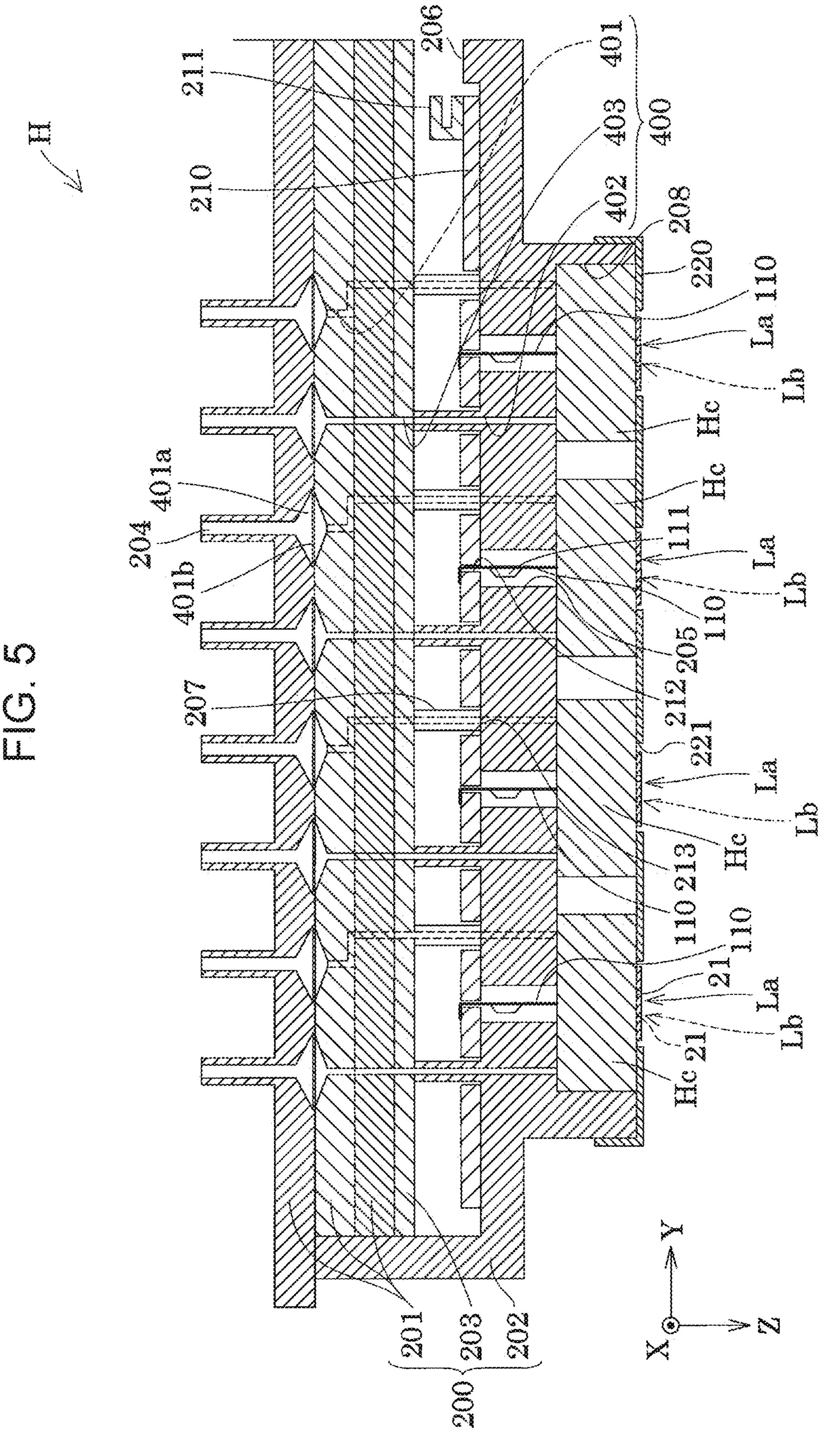
FIG. 5 is a cross-sectional view taken along line V-V in FIG. 4.

Next, the liquid ejecting head H will be described with reference to FIGS. 3 to 5. FIG. 3 is an exploded perspective view of the liquid ejecting head. FIG. 4 is a plan view of the liquid ejecting head H when viewed in the −Z direction. FIG. 5 is a cross-sectional view taken along line V-V in FIG. 4.

As illustrated, the liquid ejecting head H includes a plurality of head chips Hc, a flow path member 200 having a flow path 400, a relay substrate 210, and a cover head 220.

The flow path member 200 includes a first flow path member 201 provided with a first flow path 401, a second flow path member 202 provided with a second flow path 402, and a sealing member 203 that couples the first flow path 401 and the second flow path 402 to each other in a liquid-tight state. The first flow path member 201, the sealing member 203, and the second flow path member 202 are stacked in the +Z direction in this order.

In the present embodiment, the first flow path member 201 is configured by stacking three members in the Z-axis direction. The first flow path member 201 includes a coupling portion 204 coupled to the liquid storage section 3 in which a liquid is stored. In the present embodiment, the coupling portion 204 is provided to protrude in a tubular shape in the −Z direction from the surface of the first flow path member 201 in the −Z direction. The liquid storage section 3 may be directly coupled to the coupling portion 204 or may be coupled via a supply pipe or the like such as a tube. The first flow path 401 to which the liquid from the liquid storage section 3 is supplied is provided inside the coupling portion 204. The first flow path 401 includes a flow path extending in the Z-axis direction, a flow path extending along a stacking interface of the stacked members, and the like. In addition, a widened liquid reservoir 401*a* having an inner diameter wider than other regions is provided in the middle of the first flow path 401. A filter 401*b* is provided in the liquid reservoir 401*a*. In the present embodiment, one first flow path member 201 includes eight coupling portions 204 and eight independent first flow paths 401.

The second flow path member 202 includes a plurality of second flow paths 402 communicating with the respective end portions of a plurality of first flow paths 401 on the side opposite to the coupling portions 204. That is, in the present embodiment, one second flow path member 202 includes eight independent second flow paths 402. The first flow path 401 and the second flow path 402 are liquid-tightly coupled to each other via the sealing member 203. For the sealing member 203, a material which has liquid resistance to the liquid used in the liquid ejecting head H and is elastically deformable, for example, a rubber, elastomer or the like may be used. Such a sealing member 203 is provided with a coupling flow path 403 penetrating in the Z-axis direction. The first flow path 401 and the second flow path 402 communicate with each other via the coupling flow path 403. That is, the flow path member 200 is provided with eight independent flow paths 400 including the first flow path 401, the second flow path 402, and the coupling flow path 403.

The plurality of head chips Hc are held on the surface of the second flow path member 202 facing the +Z direction. Specifically, the second flow path member 202 includes an accommodation portion 208 having a recessed shape that opens on the surface facing the +Z direction, and the head chip Hc is accommodated in the accommodation portion 208. The liquid ejecting head H in the present embodiment holds a plurality of head chips, and in the present embodiment, the liquid ejecting head H holds four head chips Hc as an example. In the present embodiment, the four head chips Hc are arranged side by side in the Y-axis direction to be located at the same position in the X-axis direction.

In the present embodiment, a configuration in which one accommodation portion 208 is provided in common to all the head chips Hc is described, but the configuration is not particularly limited thereto. For example, the accommodation portion 208 may be provided independently for each head chip Hc, or may be independently provided for each group of a plurality (two or more) of head chips Hc. By providing the accommodation portion 208 in common to the plurality of head chips Hc, there is no wall between the two head chips Hc, and thus it is possible to reduce the size of the liquid ejecting head H in the Y-axis direction.

The second flow path 402 communicates with each inlet 44 of such a head chip Hc.

The second flow path member 202 is provided with a wiring insertion hole 205 for inserting a wiring member 110 of each head chip Hc. In the present embodiment, one wiring insertion hole 205 is provided for each head chip Hc. That is, in the present embodiment, four wiring insertion holes 205 in total are provided for the four head chips Hc. The wiring member 110 of the head chip Hc is flowed out to the surface side of the second flow path member 202 facing the −Z direction via the wiring insertion hole 205.

In the Z-axis direction, the relay substrate 210 to which the wiring members 110 of the plurality of head chips Hc are commonly coupled is provided between the second flow path member 202 and the sealing member 203. The relay substrate 210 is formed of a hard rigid substrate with no flexibility. Wirings, electronic components, and the like (not illustrated) are mounted on the relay substrate 210. In the present embodiment, as an electronic component, a connector 211 to which an external wiring (not illustrated) provided outside the liquid ejecting head H is coupled is illustrated. A printing signal and the like for controlling the head chip Hc are input to the relay substrate 210 from the external wiring via the connector 211, and is supplied from the relay substrate 210 to each head chip Hc. An external wiring opening portion 206 for inserting an external wiring coupled to the connector 211 is provided on the side wall of the flow path member 200, that faces the connector 211. The external wiring is coupled to the connector 211 of the relay substrate 210, which is provided inside the flow path member 200, via the external wiring opening portion 206.

The relay substrate 210 is provided with a wiring insertion hole 212 for flowing out the wiring member 110 of the head chip Hc to the surface side facing the −Z direction. One wiring insertion hole 212 is provided for each head chip Hc, and four wiring insertion holes 212 in total are provided.

In addition, the relay substrate 210 is provided with a protrusion portion insertion hole 213 provided to penetrate the relay substrate 210 in the Z-axis direction. A protrusion portion 207 in which the second flow path 402 is provided is provided on the surface of the second flow path member 202 facing the −Z direction to protrude in the −Z direction. The protrusion portion 207 is inserted in the −Z direction side of the relay substrate 210 via the protrusion portion insertion hole 213, and thus is coupled to the coupling flow path 403.

The cover head 220 is fixed to the surface of the flow path member 200 facing the +Z direction. The cover head 220 defines a space of the accommodation portion 208 that accommodates the head chip Hc. In the present embodiment, the cover head 220 has a size enough for covering four head chips Hc. The cover head 220 is a common member fixed to the surfaces of the four head chips Hc facing the +−Z direction. In addition, the cover head 220 is provided with an exposure opening portion 221 that exposes a nozzle 21 of the head chip Hc in the +Z direction independently for each head chip Hc. An ink is ejected from the nozzle 21 exposed from the exposure opening portion 221 in the +Z direction.

Figure 6:
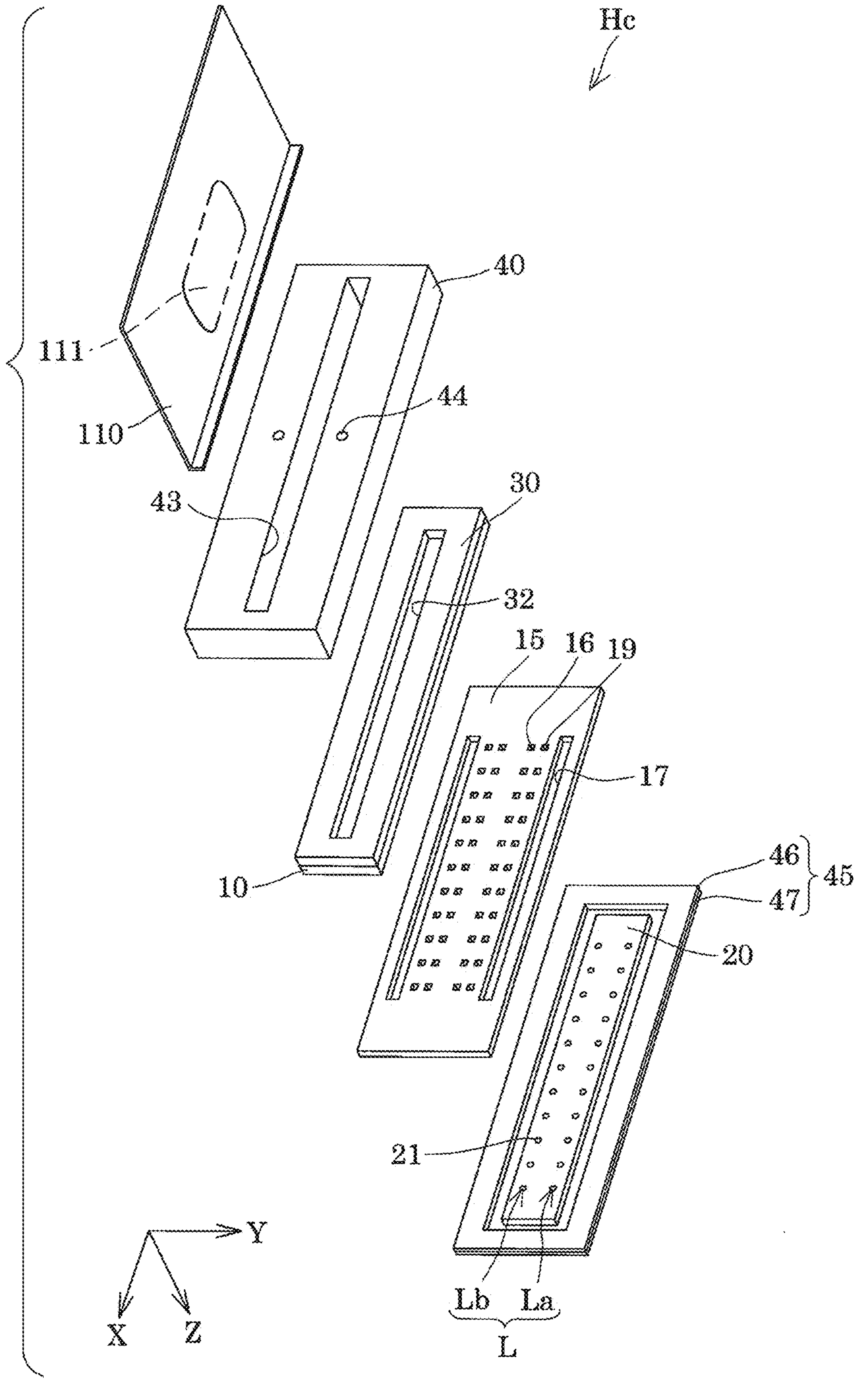
FIG. 6 is an exploded perspective view of a head chip according to the first embodiment of the present disclosure.
Figure 7:
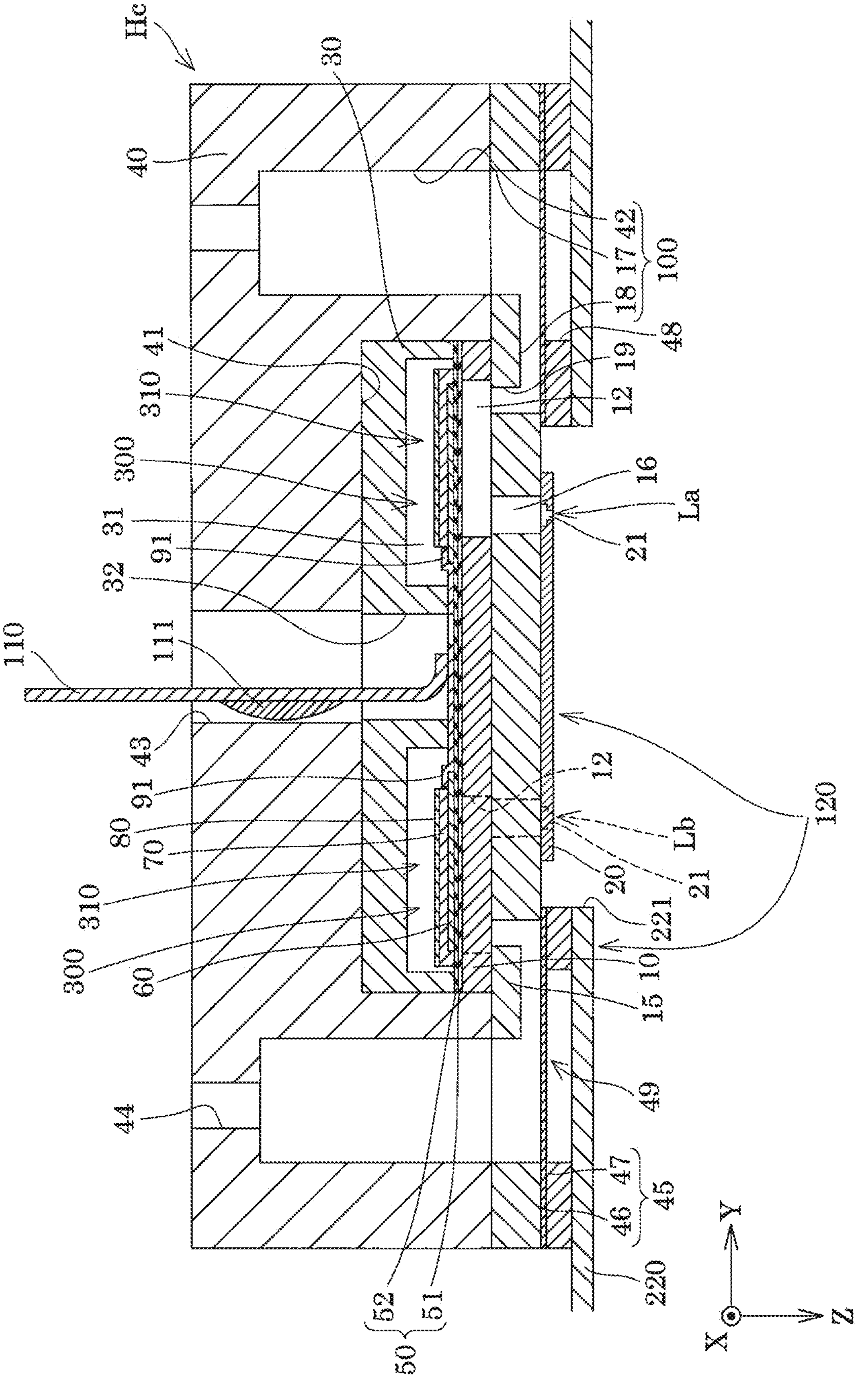
FIG. 7 is a cross-sectional view of the head chip according to the first embodiment of the present disclosure.

An example of the head chip Hc in the present embodiment will be described. FIG. 6 is an exploded perspective view of the head chip Hc. FIG. 7 is a cross-sectional view of the head chip Hc. FIG. 7 illustrates a portion of the cover head 220 in addition to the head chip Hc.

The head chip Hc includes one nozzle plate 20 in which a plurality of nozzles 21 are formed, the flow path forming substrate 10, a communication plate 15, a protective substrate 30, a case member 40, a piezoelectric actuator 300, and the wiring member 110.

The flow path forming substrate 10 is made of a silicon substrate or the like, for example. On the flow path forming substrate 10, a plurality of pressure chambers 12 are disposed side by side along the X-axis direction. The plurality of pressure chambers 12 are disposed on a straight line along the X-axis direction such that positions in the Y-axis direction are the same. The two pressure chambers 12 adjacent to each other in the X-axis direction are partitioned by partition walls which are not illustrated. In addition, in the present embodiment, two rows of pressure chambers 12 in which the pressure chambers 12 are arranged side by side in the X-axis direction are provided in the Y-axis direction. The two rows of pressure chambers are disposed to be shifted from each other by a so-called half pitch, that is, by half the pitch between the pressure chambers 12 in the X-axis direction. That is, all the pressure chambers 12 in the two rows of pressure chambers are disposed along the X-axis direction in a staggered manner.

The communication plate 15 and the nozzle plate 20 are sequentially stacked on the surface of the flow path forming substrate 10 facing the +Z direction. A diaphragm 50 and the piezoelectric actuator 300 are sequentially stacked on the surface of the flow path forming substrate 10 facing the −Z direction.

The communication plate 15 is formed of a plate-shaped member bonded to the surface of the flow path forming substrate 10 facing the +Z direction. The communication plate 15 is provided with a nozzle communication passage 16 through which the pressure chamber 12 and the nozzle 21 communicate with each other. The communication plate 15 is provided with a first manifold portion 17 and a second manifold portion 18 that form a portion of a manifold 100 serving as a common liquid chamber with which the plurality of pressure chambers 12 commonly communicate. The first manifold portion 17 is provided to penetrate the communication plate 15 in the Z-axis direction. The second manifold portion 18 is provided to open on the surface on the side facing the +Z direction without penetrating the communication plate 15 in the Z-axis direction. Furthermore, the communication plate 15 is provided with a supply communication passage 19 communicating with the pressure chamber 12 independently in each of the pressure chambers 12. The supply communication passage 19 communicates between the second manifold portion 18 and the pressure chambers 12 to supply the ink in the manifold 100 to the pressure chambers 12. As such a communication plate 15, a silicon substrate, a glass substrate, an SOI substrate, various ceramic substrates, a metal substrate such as a stainless steel substrate, or the like can be used.

The nozzle plate 20 is bonded to the side of the communication plate 15 opposite to the flow path forming substrate 10, that is, to the surface facing the +Z direction. A plurality of nozzles 21 communicating with the respective pressure chambers 12 via nozzle communication passages 16 are formed in the nozzle plate 20. In the present embodiment, the plurality of nozzles 21 are disposed to be arranged in a row along the X-axis direction. In the present embodiment, two nozzle rows L, in which the nozzles 21 are arranged side by side along the X-axis direction, are provided at a distance in the Y-axis direction. In the present embodiment, the two nozzle rows L are referred to as a nozzle row La and a nozzle row Lb in the +Y direction in this order. When the nozzle rows La and Lb are not distinguished from each other, the nozzle rows La and Lb are referred to as the nozzle row L below. The nozzle rows La and Lb are disposed to be shifted from each other by a so-called half pitch, that is, by half the pitch between the nozzles 21, in the X-axis direction. That is, all of the nozzles 21 in the nozzle rows La and Lb are disposed in a staggered manner along the X-axis direction. In the present embodiment, as illustrated in FIG. 7, the nozzle row La is located in the −X direction from the nozzle row Lb. That is, the nozzle 21 at the end portion of the nozzle row La in the −X direction is located in the −X direction from the nozzle 21 at the end portion of the nozzle row Lb in the −X direction.

As such a nozzle plate 20, a silicon substrate, a glass substrate, an SOI substrate, various ceramic substrates, a metal substrate such as a stainless steel substrate, an organic substance such as a polyimide resin, or the like can be used. A surface of the nozzle plate 20 facing the +Z direction forms a portion of the ejection surface 120 of the liquid ejecting head H.

In the present embodiment, the diaphragm 50 includes an elastic film 51 that is provided on the flow path forming substrate 10 side and is formed of silicon oxide, and an insulator film 52 that is provided on the surface of the elastic film 51 facing the −Z direction and is formed of zirconium oxide. The diaphragm 50 may be formed of only the elastic film 51 or only the insulator film 52, and may have a configuration in which other films are provided in addition to the elastic film 51 and the insulator film 52.

The piezoelectric actuator 300 includes a first electrode 60, a piezoelectric layer 70, and a second electrode 80 that are sequentially stacked on the diaphragm 50 in the −Z direction. Such a piezoelectric actuator 300 is also referred to as a piezoelectric element, and refers to a portion including the first electrode 60, the piezoelectric layer 70, and the second electrode 80. In addition, a portion where piezoelectric strain occurs in the piezoelectric layer 70 when a voltage is applied between the first electrode 60 and the second electrode 80 is referred to as an active portion 310. That is, the active portion 310 refers to a portion where the piezoelectric layer 70 is interposed between the first electrode 60 and the second electrode 80. In the present embodiment, the active portion 310 is formed for each pressure chamber 12. The plurality of active portions 310 serve as “driving elements” that cause pressure changes in the ink inside the pressure chamber 12. In general, any one of the electrodes of the active portion 310 is configured as an independent individual electrode for each active portion 310, and the other electrode is configured as a common electrode common to the plurality of active portions 310. In the present embodiment, the first electrode 60 is separated for each active portion 310 to form an individual electrode of the active portion 310, and the second electrode 80 is continuously provided over the plurality of active portions 310 to form a common electrode for the plurality of active portions 310. The first electrode 60 may form a common electrode, and the second electrode 80 may form an individual electrode.

The piezoelectric layer 70 is configured by using a piezoelectric material made of, for example, a perovskite structure composite oxide represented by the general formula $ABO_3$.

An individual lead electrode 91, which is a lead-out wiring, is drawn out from the first electrode 60. A common lead electrode, which is a lead-out wiring (not illustrated), is drawn out from the second electrode 80. The wiring member 110 formed of a flexible substrate having flexibility is coupled to the end portions of the individual lead electrode 91 and the common lead electrode opposite to the end portions thereof coupled to the piezoelectric actuator 300. A drive signal selection circuit 111 is mounted on the wiring member 110. The drive signal selection circuit 111 has a plurality of switching elements for selecting whether or not to supply a drive signal COM for driving each active portion 310 to each active portion 310. That is, the wiring member 110 in the present embodiment is a chip-on-film (COF). The drive signal selection circuit 111 may not be provided in the wiring member 110. That is, the wiring member 110 may be a flexible flat cable (FFC), a flexible printed circuits (FPC), and the like.

Further, a protective substrate 30 having substantially the same size as that of the flow path forming substrate 10 is bonded to the surface of the flow path forming substrate 10 facing the −Z direction. The protective substrate 30 includes an accommodation portion 31 which is a space for protecting the piezoelectric actuator 300. The accommodation portion 31 is independently provided for each row of the piezoelectric actuators 300 disposed to be arranged in the X-axis direction. Two accommodation portions 31 are formed to be arranged in the Y-axis direction. A through-hole 32 penetrating in the Z-axis direction is provided between the two accommodation portions 31 disposed to be arranged in the Y-axis direction, in the protective substrate 30. The end portions of the individual lead electrode 91 and the common lead electrode (not illustrated) drawn out from the electrodes of the piezoelectric actuator 300 are extended to be exposed in the through-hole 32. The individual lead electrode 91 and the common lead electrode are electrically coupled to the wiring member 110 in the through-hole 32. As such a protective substrate 30, for example, a substrate made of a silicon substrate, a glass substrate, an SOI substrate, and various ceramic substrates is used similarly to the flow path forming substrate 10.

A case member 40 for defining the manifold 100 communicating with the plurality of pressure chambers 12 together with the flow path forming substrate 10 is fixed on the protective substrate 30. The case member 40 has substantially the same shape as the communication plate 15 described above in plan view, and is bonded to the protective substrate 30 and also bonded to the communication plate 15 described above. Such a case member 40 has a recess portion 41 having a depth for accommodating the flow path forming substrate 10 and the protective substrate 30 on the protective substrate 30 side. The case member 40 is provided with a third manifold portion 42 communicating with the first manifold portion 17 of the communication plate 15. The first manifold portion 17 and the second manifold portion 18 provided in the communication plate 15 and the third manifold portion 42 provided in the case member 40 configure the manifold 100 of the present embodiment. The manifold 100 is provided for each of the nozzle rows La and Lb, that is, two manifolds in total are provided. Therefore, different liquids can be ejected from the nozzle rows La and Lb. The case member 40 is provided with an inlet 44 that communicates with the manifolds 100 to supply an ink to each of the manifolds 100. In addition, the case member 40 is provided with a coupling port 43 through which the wiring member 110 is inserted to communicate with the through-hole 32 of the protective substrate 30. The wiring member 110 is flowed out to the surface side of the liquid ejecting head H facing the −Z direction, via the coupling port 43. As the case member 40, a metal material, a resin material, or the like can be used.

A compliance substrate 45 is provided on the surface of the communication plate 15 on the +Z direction side where the first manifold portion 17 and the second manifold portion 18 are open. The compliance substrate 45 seals the openings of the first manifold portion 17 and the second manifold portion 18 on the +Z direction side. Such a compliance substrate 45 includes a sealing film 46 made of a flexible thin film and a fixation substrate 47 made of a hard material such as metal in the present embodiment. Since a region of the fixation substrate 47 facing the manifold 100 is an opening 48 that is completely removed in the thickness direction, one surface of the manifold 100 is a compliance portion 49 which is a flexible portion sealed only by the flexible sealing film 46. The head chip Hc is fixed to the cover head 220 by fixing the surface of the fixation substrate 47 facing the +Z direction to the surface of the cover head 220 facing the −Z direction, with an adhesive or the like. As described above, the cover head 220 is a common member fixed to each of the fixation substrates 47 of the plurality of (in the present embodiment, four) head chips Hc. Therefore, the four head chips Hc are integrated by the cover head 220. The surface of such a cover head 220 facing the +Z direction forms a portion of the ejection surface 120.

In such a head chip Hc, the liquid is taken in from the inlet 44, and the inside of the flow path from the manifold 100 to the nozzle 21 is filled with the liquid. Thereafter, a voltage is applied to each active portion 310 corresponding to the pressure chamber 12 in accordance with a signal from the drive signal selection circuit 111, and thus the diaphragm 50 is flexurally deformed along with the piezoelectric actuator 300. Thus, pressure of the liquid in the pressure chamber 12 increases, and droplets are ejected from a predetermined nozzle 21.

Figure 8:
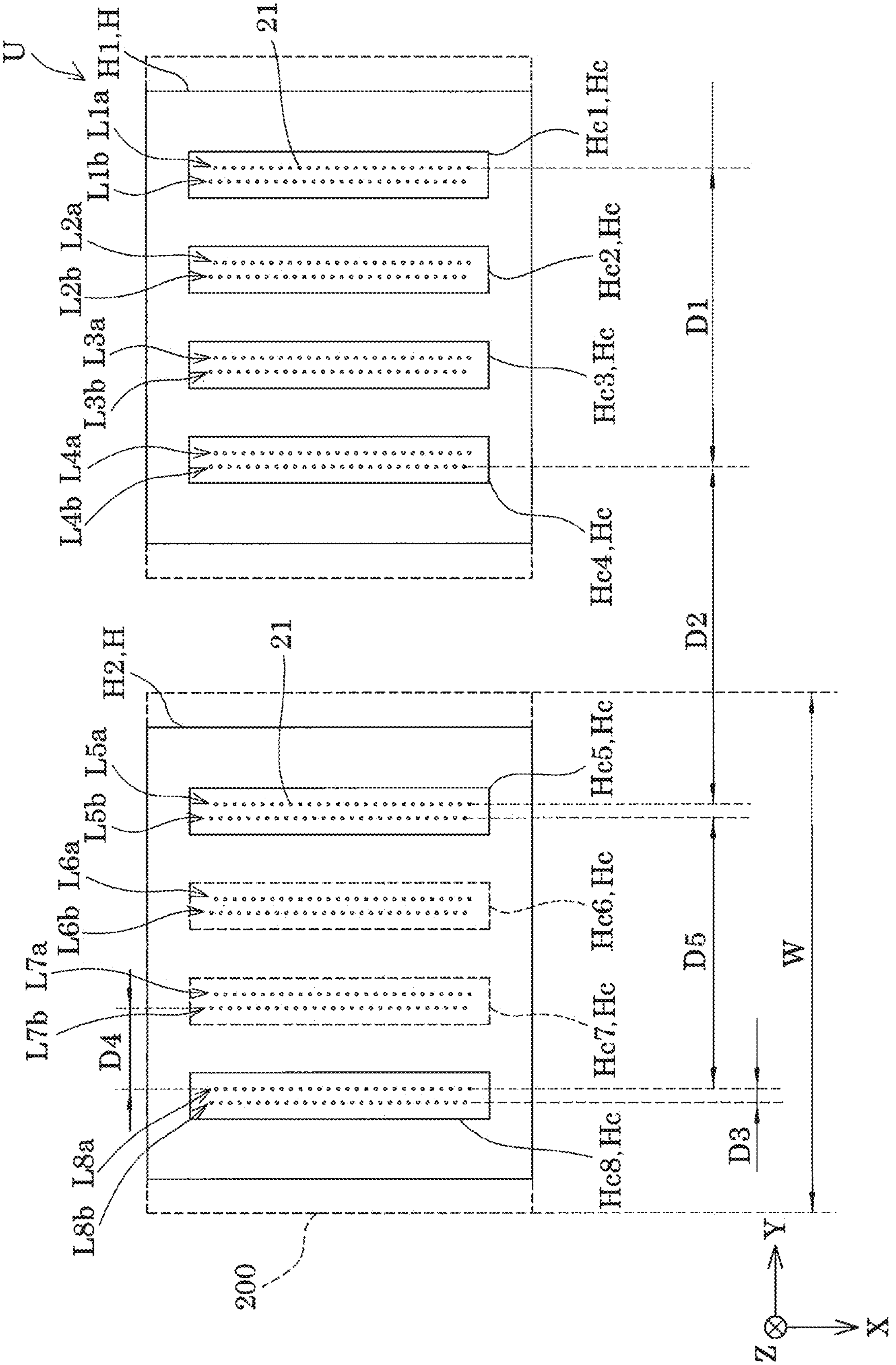
FIG. 8 is a plan view of the head unit according to the first embodiment of the present disclosure.

The head unit U will be described in detail with reference to FIG. 8. FIG. 8 is a plan view of the head unit U. FIG. 8 illustrates only the liquid ejecting head H, the head chip Hc, and the nozzle row L of the head unit U, and does not illustrate other members such as the support U1. In FIG. 8, the outer shape of the liquid ejecting head His illustrated by a broken line.

The head unit U includes a plurality of liquid ejecting heads H disposed to be arranged in the +Y direction. In the present embodiment, the head unit U includes two liquid ejecting heads H. Specifically, the liquid ejecting head H1 is disposed on the +Y direction side with respect to the liquid ejecting head H2, and the liquid ejecting head H2 is disposed at the end in the −Y direction among the plurality of liquid ejecting heads H provided in the head unit U.

The liquid ejecting head H1 includes a plurality of head chips Hc. In the present embodiment, the liquid ejecting head H1 includes four head chips Hc. The four head chips Hc are arranged side by side along the Y-axis direction to be located at the same position in the X-axis direction. The four head chips Hc are referred to as head chips Hc1 to Hc4 in the −Y direction in this order.

The liquid ejecting head H2 includes a plurality of head chips Hc. In the present embodiment, the liquid ejecting head H2 includes four head chips Hc. The four head chips Hc are arranged side by side along the Y-axis direction to be located at the same position in the X-axis direction. The four head chips Hc are referred to as head chips Hc5 to Hc8 in the −Y direction in this order.

The head chip Hc8 of the liquid ejecting head H2 is disposed in the −Y direction with respect to the head chip Hc5 of the liquid ejecting head H2. Further, the head chip Hc8 of the liquid ejecting head H2 is disposed at the end in the −Y direction among a plurality of head chips Hc in the liquid ejecting head H2. The head chip Hc5 of the liquid ejecting head H2 is disposed at the end in the +Y direction among the plurality of head chips Hc in the liquid ejecting head H2.

The nozzle rows La and Lb of the head chip Hc1 are referred to as nozzle rows L1*a* and L1*b*. The nozzle rows La and Lb of the head chip Hc2 are referred to as nozzle rows L2*a* and L2*b*. The nozzle rows La and Lb of the head chip Hc3 are referred to as nozzle rows L3*a* and L3*b*. The nozzle rows La and Lb of the head chip Hc4 are referred to as nozzle rows L4*a* and L4*b*. That is, in the liquid ejecting head H1, eight nozzle rows L1*a*, L1*b*, L2*a*, L2*b*, L3*a*, L3*b*, L4*a*, and L4*b* are disposed to be arranged in the −Y direction in this order.

The nozzle rows La and Lb of the head chip Hc5 are referred to as nozzle rows L5*a* and L5*b*. The nozzle rows La and Lb of the head chip Hc6 are referred to as nozzle rows L6*a* and L6*b*. The nozzle rows La and Lb of the head chip Hc7 are referred to as nozzle rows L7*a* and L7*b*. The nozzle rows La and Lb of the head chip Hc8 are referred to as nozzle rows L8*a* and L8*b*. That is, in the liquid ejecting head H2, eight nozzle rows L5*a*, L5*b*, L6*a*, L6*b*, L7*a*, L7*b*, L8*a*, and L8*b* are disposed to be arranged in the −Y direction in this order.

The phrase that the nozzle rows L are disposed to be arranged in the Y-axis direction means that, in the two adjacent nozzle rows L in the Y-axis direction, regions along the X axis, in which the respective nozzle rows L are provided, at least partially overlap each other when viewed in the Y-axis direction. The region along the X axis, in which the nozzle row L is provided, refers to a region from the nozzle 21 at the end portion in the +X direction to the nozzle 21 at the end portion in the −X direction among the plurality of nozzles 21 arranged along the X axis. Therefore, this also includes a case where, among the adjacent two nozzle rows L in the Y-axis direction, some of the nozzles 21 in one nozzle row L does not overlap a region of the other nozzle row L when viewed in the Y-axis direction.

As shown in Table ta1 of FIG. 9, the nozzle row L1*a* ejects an overcoat liquid and the nozzle row L1*b* ejects a cyan ink. The nozzle row L2*a* ejects an orange ink, and the nozzle row L2*b* ejects a red ink. The nozzle row L3*a* ejects a green ink, and the nozzle row L3*b* ejects a yellow ink. The nozzle row L4*a* ejects a magenta ink, and the nozzle row L4*b* ejects a black ink. The nozzle row La and the nozzle row L5*b* eject the treatment liquid, and the nozzle row L8*a* and the nozzle row L8*b* eject the reaction liquid.

In the present embodiment, the nozzle rows L6*a*, L6*b*, L7*a*, and L7*b* are unused nozzle rows L that eject no liquid. That is, the plurality of head chips Hc in the liquid ejecting head H2 include dummy head chips Hc6 and Hc7 that are disposed between the head chip Hc5 and the head chip Hc8 in the Y-axis direction and eject no liquid. Although the head chips Hc6 and Hc7 eject no liquid, the head chips Hc6 and Hc7 have the same configuration as the other head chips Hc1 to Hc5, and Hc8 that eject the liquids. Although two dummy head chips are provided in the present embodiment, the number is not limited thereto.

As described above, the liquid ejecting head H1 includes the head chip Hc1 having the nozzle row L1*a* for ejecting the overcoat liquid and the nozzle row L1*b* for ejecting the ink, and the head chips Hc2 to Hc4 having the nozzle rows L2*a*, L2*b*, L3*a*, L3*b*, L4*a*, and L4*b* for ejecting inks. The liquid ejecting head H2 includes the head chip Hc8 having the nozzle rows L8*a* and L8*b* for ejecting the reaction liquid and the head chip Hc5 having the nozzle rows L5*a* and L5*b* for ejecting the treatment liquid.

The nozzle row L for ejecting the reaction liquid and the nozzle row L for ejecting the treatment liquid are not disposed in the same head chip Hc among the plurality of head chips Hc in the liquid ejecting head H2. In other words, the nozzle rows L8*a* and L8*b* for ejecting the reaction liquid and the nozzle rows L5*a* and L5*b* for ejecting the treatment liquid are provided in the head chips Hc different from each other.

In the head unit U having such a configuration, a distance between the nozzle rows L is defined as follows.

A first distance D1 is a distance between two nozzle rows L disposed at both ends in the Y-axis direction among a plurality of nozzle rows L in the liquid ejecting head H. As an example in the liquid ejecting head H1, the first distance D1 is a distance in the +Y direction between the nozzle row L1*a* disposed at the end in the +Y direction and the nozzle row L4*b* disposed at the end in the −Y direction among the plurality of nozzle rows L in the liquid ejecting head H1.

A second distance D2 is a distance in the +Y direction between the nozzle row L4*b* and the nozzle row L5*a*. The nozzle row L4*b* is the nozzle row L closest to the liquid ejecting head H2 among the plurality of nozzle rows L in the liquid ejecting head H1. The nozzle row L5*a* is the nozzle row L closest to the liquid ejecting head H1 among a plurality of nozzle rows L in the liquid ejecting head H2.

A third distance D3 is a distance in the +Y direction between the adjacent nozzle rows L among a plurality of nozzle rows L in the head chip Hc. In the present embodiment, since one head chip Hc has two nozzle rows La and Lb, a distance between the nozzle row La and the nozzle row Lb is the third distance D3.

A fourth distance D4 is a distance in the +Y direction between the nozzle row L closest to the other head chip Hc among a plurality of nozzle rows L in one head chip Hc and the nozzle row L closest to the one head chip Hc among a plurality of nozzle rows L in the other head chip Hc in two adjacent head chips Hc among a plurality of head chips Hc in the liquid ejecting head H. As an example in the adjacent head chips Hc7 and Hc8 of the liquid ejecting head H2, the fourth distance D4 is a distance in the +Y direction between the nozzle row L8*a* and the nozzle row L7*b*. The nozzle row L8*a* is closest to the head chip Hc7 among a plurality of nozzle rows L in the head chip Hc8. The nozzle row L7*b* is closest to the head chip Hc8 among a plurality of nozzle rows L in the head chip Hc7.

A fifth distance D5 is the shortest distance in the +Y direction between the nozzle row L for ejecting the reaction liquid in the liquid ejecting head H2 and the nozzle row L for ejecting the treatment liquid in the liquid ejecting head H2. In the present embodiment, a distance in the +Y direction between the nozzle row L8*a* of the head chip Hc8 and the nozzle row L5*b* of the head chip Hc5 is the fifth distance D5.

The relationship between the above-described distances is defined as follows. The second distance D2 is longer than the first distance D1. The fourth distance D4 is longer than the third distance D3. The fifth distance D5 is longer than the fourth distance D4. As illustrated in FIG. 8, the second distance D2 is smaller than a dimension W of the liquid ejecting head H in the Y-axis direction. The dimension W of the liquid ejecting head H in the Y-axis direction is a dimension related to an outer shape of the liquid ejecting head H when viewed in the Z-axis direction. In the present embodiment, the dimension W corresponds to an outer dimension of the flow path member 200. The outer shape of the liquid ejecting head H may be an outer shape of a component other than the flow path member 200, or may be defined by a combination of a plurality of components.

The head unit U having such a configuration forms an image by performing unidirectional printing. Specifically, the moving process of the medium S is executed every time the +Y direction printing process for forming a partial image corresponding to one band width is executed twice.

In the first +Y direction printing process, while the head unit U moves in the +Y direction, the liquid ejecting head H1 ejects the ink of each color except for the overcoat liquid, and the liquid ejecting head H2 ejects the reaction liquid. Thereafter, the head unit U is moved to the −Y direction side of the medium S.

In the second +Y direction printing process, while the head unit U moves in the +Y direction, the liquid ejecting head H1 ejects the overcoat liquid, and the liquid ejecting head H2 ejects the treatment liquid. Thereafter, the moving process of moving the medium S in the +X direction is executed. In such unidirectional printing, the ink, the reaction liquid, the overcoat liquid, and the treatment liquid are ejected in this order to a region corresponding to one band width of the medium S, whereby a partial image is formed.

The head unit U that ejects the ink, the reaction liquid, the treatment liquid, and the overcoat liquid described above includes the plurality of the liquid ejecting heads H disposed to be arranged along the +Y direction. Each of the plurality of liquid ejecting heads H includes the plurality of head chips Hc having one or more nozzle rows L. The first distance D1 is a distance in the +Y direction between the nozzle row L1*a* disposed at the end in the +Y direction and the nozzle row L4*b* disposed at the end in the −Y direction among the plurality of nozzle rows in the liquid ejecting head H. The plurality of liquid ejecting heads H include the liquid ejecting head H1 and the liquid ejecting head H2 adjacent to each other. The second distance D2 in the +Y direction between the nozzle row L4*b* (that is the nozzle row closest to the liquid ejecting head H2 among the plurality of nozzle rows L in the liquid ejecting head H1) and the nozzle row L5*a* (that is the nozzle row closest to the liquid ejecting head H1 among the plurality of nozzle rows L in the liquid ejecting head H2) is longer than the first distance D1. The liquid ejecting head H1 includes the head chip Hc1 having the nozzle rows L1*a* and L1*b* for ejecting the ink and the overcoat liquid, and the plurality of head chips Hc2, Hc3, and Hc4 having the nozzle rows L2*a*, L2*b*, L3*a*, L3*b*, L4*a*, and L4*b* for ejecting the inks. The liquid ejecting head H2 includes the head chip Hc8 having the nozzle rows L8*a* and L8*b* for ejecting the reaction liquid and the head chip Hc5 having the nozzle rows La and L5*b* for ejecting the treatment liquid.

In the head unit U having such a configuration, the liquid ejecting head H1 including the head chip Hc1 that ejects the overcoat liquid and the ink that reacts with the reaction liquid, and the head chips Hc2 to Hc4 that eject the inks, and the liquid ejecting head H2 including the head chip Hc8 that ejects the reaction liquid are separately provided. In other words, in any one of the plurality of liquid ejecting heads H, the head chip Hc1 that ejects the ink and the overcoat liquid, and the head chips Hc2 to Hc4 that eject the inks are not disposed together with the head chip Hc8 that ejects the reaction liquid. As a result, mist of the reaction liquid generated when the reaction liquid is ejected from the liquid ejecting head H2 is less likely to affect clogging of the nozzle 21 of the liquid ejecting head H1. That is, it is possible to reduce the risk that the mist of the reaction liquid reacts with the ink or the overcoat liquid in the nozzle 21 of the liquid ejecting head H1, and thus the mist aggregates with the ink or the overcoat liquid, and the nozzle 21 is clogged.

Further, the head chip Hc8 that ejects the reaction liquid and the head chip Hc5 that ejects the treatment liquid are provided in the same liquid ejecting head H2. As a result, it is not necessary to separately provide the liquid ejecting head only for ejecting the reaction liquid, and thus it is possible to reduce the number of liquid ejecting heads and to reduce the size of the head unit U. There is a probability that the reaction liquid of the head chip Hc8 reaches the nozzle 21 of the head chip Hc5 in the same liquid ejecting head H2. However, the reaction liquid and the treatment liquid are less likely to react with each other. Further, since the reaction liquid and the treatment liquid aggregate with each other over a time longer than the interval of the periodic cleaning described above, the mist of the reaction liquid adhering to the nozzle 21 is removed by the wiping member 9 before aggregation. Thus, even though the same liquid ejecting head H2 is provided with the head chips Hc8 and Hc5 that eject the reaction liquid and the treatment liquid, it is possible to largely reduce the probability that the nozzle 21 is clogged.

The ink and the overcoat liquid correspond to a “first liquid”. The +Y direction corresponds to a “first direction”, and the −Y direction corresponds to a “second direction”. The liquid ejecting head H1 corresponds to a “first head”, and the liquid ejecting head H2 corresponds to a “second head”. The head chip Hc1 that ejects the ink and the overcoat liquid and the head chips Hc2, Hc3, and Hc4 that eject the inks correspond to a “first head chip”. The head chip Hc8 corresponds to a “second head chip”. The head chip Hc5 corresponds to a “third head chip”. The nozzle row L1*a* for ejecting the overcoat liquid and the nozzle rows L1*b*, L2*a*, L2*b*, L3*a*, L3*b*, L4*a*, and L4*b* for ejecting the inks correspond to a “first nozzle row”. The nozzle rows L8*a* and L8*b* for ejecting the reaction liquid correspond to a “second nozzle row”. The nozzle rows L5*a* and L5*b* for ejecting the treatment liquid correspond to a “third nozzle row”. The number of head chips Hc that eject the inks is not limited to plural and may be one. The number of head chips Hc that eject the overcoat liquid is not limited to one and may be plural.

The liquid ejecting head H1 is disposed in the +Y direction with respect to the liquid ejecting head H2. The head chip Hc5 of the liquid ejecting head H2 is disposed in the +Y direction with respect to the head chip Hc8 of the liquid ejecting head H2. In the head unit U having such a configuration, it is possible to increase the distance between the liquid ejecting head H1 that ejects the ink and the overcoat liquid and the nozzle rows L8*a* and L8*b* of the head chip Hc8 that ejects the reaction liquid, and to further reduce the risk of nozzle clogging occurring.

The liquid ejecting head H2 is the liquid ejecting head H disposed at the end in the −Y direction among the two liquid ejecting heads H. In the head unit U having such a configuration, it is possible to maximize the distance between the liquid ejecting head H1 that ejects the ink and the overcoat liquid and the nozzle rows L8*a* and L8*b* of the head chip Hc8 that ejects the reaction liquid, and to further reduce the risk of nozzle clogging occurring. The present embodiment is not limited to this configuration. For example, in the head unit U including three or more liquid ejecting heads H, the liquid ejecting head H2 may not be disposed at the end in the −Y direction.

The head chip Hc8 of the liquid ejecting head H2 is the head chip Hc disposed at the end in the −Y direction among the plurality of head chips Hc in the liquid ejecting head H2. The head chip Hc5 of the liquid ejecting head H2 is the head chip Hc disposed at the end in the +Y direction among the plurality of head chips Hc in the liquid ejecting head H2. The reaction liquid and the treatment liquid are less likely to react with each other, and the risk of the nozzle 21 clogging is low but not 0. Therefore, in the same liquid ejecting head H2, by disposing the head chip Hc8 that ejects the reaction liquid and the head chip Hc5 that ejects the treatment liquid to be farthest apart from each other, it is possible to reduce the risk of nozzle clogging even for the nozzle rows L5*a* and L5*b* for ejecting the treatment liquid, which have a risk of nozzle clogging due to the reaction liquid. The present embodiment is not limited to such a configuration. The head chip Hc8 may not be disposed at the end in the −Y direction, and the head chip Hc5 may not be disposed at the end in the +Y direction.

The third distance D3 is the distance in the +Y direction between the nozzle rows L adjacent to each other among the plurality of nozzle rows L in the head chip Hc. The fourth distance D4 is the distance in the +Y direction between the nozzle row L8*a* closest to the head chip Hc7 among the plurality of nozzle rows L in one head chip Hc8 and the nozzle row L7*b* closest to the head chip Hc8 among the plurality of nozzle rows L in the other head chip Hc7 in the two adjacent head chips Hc8 and Hc7 among the plurality of head chips Hc in the liquid ejecting head H. The fourth distance D4 is longer than the third distance D3. The nozzle rows L8*a* and L8*b* for ejecting the reaction liquid in the liquid ejecting head H2 and the nozzle rows L5*a* and L5*b* for ejecting the treatment liquid in the liquid ejecting head H2 are not disposed in the same head chip Hc among the plurality of head chips Hc in the liquid ejecting head H2. As described above, with the configuration in which the same head chip Hc is caused not to eject the reaction liquid and the treatment liquid, it is possible to reduce the risk of nozzle clogging even for the nozzle rows L5*a* and L5*b* for ejecting the treatment liquid, which have a risk of nozzle clogging due to the reaction liquid. The present embodiment is not limited to such a configuration, and a configuration in which the same head chip Hc is caused to eject the reaction liquid and the treatment liquid may be adopted.

The shortest fifth distance D5 in the +Y direction between the nozzle row L8*a* of the liquid ejecting head H2 and the nozzle row L5*b* of the liquid ejecting head H2 is longer than the fourth distance D4. As described above, by disposing the head chip Hc5 that ejects the treatment liquid at the position of the fifth distance D5 away from the head chip Hc7 adjacent by the fourth distance D4 when viewed from the head chip Hc8 that ejects the reaction liquid, it is possible to reduce the risk of nozzle clogging even for the nozzle rows L5*a* and L5*b* for ejecting the treatment liquid, which have the risk of nozzle clogging due to the reaction liquid.

The plurality of head chips Hc in the liquid ejecting head H2 include the head chips Hc6 and Hc7 that eject no liquid and are disposed between the head chip Hc8 of the liquid ejecting head H2 and the head chip Hc5 of the liquid ejecting head H2 in the +Y direction. As a result, it is possible to separate the head chip Hc8 and the head chip Hc5 from each other. Thus, it is possible to reduce the risk of nozzle clogging even for the nozzle rows L5*a* and L5*b* for ejecting the treatment liquid, which have the risk of nozzle clogging due to the reaction liquid. The head chips Hc6 and Hc7 that eject no liquid correspond to “dummy head chips”. The present disclosure is not limited to the configuration in which the two dummy head chips are disposed as in the present embodiment, and the number of dummy head chips is any number. A configuration in which the dummy head chip is not disposed in the liquid ejecting head H2 may be adopted. In addition, the dummy head chip is not disposed between the head chip Hc8 and the head chip Hc5, and the dummy head chip may be disposed on the −Y direction side of the head chip Hc8 and on the +Y direction side of the head chip Hc5. Further, the dummy head chip may be disposed in the liquid ejecting head H1. In order to cover the head chips Hc6 and Hc7, the exposure opening portions 221 corresponding to the head chips Hc6 and Hc7 may not be formed in the cover head 220. The head chips Hc6 and Hc7 may not be provided in the liquid ejecting head H2, and the exposure opening portions 221 corresponding to the head chips Hc6 and Hc7 may not be formed in the cover head 220.

The second distance D2 is smaller than the dimension of the liquid ejecting head H in the Y-axis direction. With such a configuration, it is possible to reduce the size of the head unit U in the Y-axis direction while reducing the influence of the mist of the reaction liquid on the nozzles 21 that eject the ink and the overcoat liquid.

The liquid ejecting head H2 does not include the head chips Hc1, Hc2, Hc3, and Hc4 that eject the "first liquid" such as the ink and the overcoat liquid. The treatment liquid is a liquid containing the softening agent.

The liquid ejecting apparatus 1 includes the head unit U and the moving mechanism 6 that reciprocates the head unit U in the +Y direction and the −Y direction. According to such a liquid ejecting apparatus 1, it is possible to reduce the risk that the mist of the reaction liquid reacts with the ink or the overcoat liquid in the nozzle 21 of the liquid ejecting head H1, and thus the mist aggregates with the ink or the overcoat liquid, and the nozzle 21 is clogged. In addition, it is possible to reduce the size of the liquid ejecting apparatus 1 because it is not necessary to separately provide the liquid ejecting head only for ejecting the reaction liquid.

First Modification Example of First Embodiment

Table ta2 of FIG. 10 shows a first modification example that has the same configuration as the head unit U illustrated in FIG. 8, but the liquid to be ejected is changed. The first modification example is different from the first embodiment in that the order of the ink and the overcoat liquid in the liquid ejecting head H1 is reversed. Specifically, the nozzle row L1*a* ejects a cyan ink and the nozzle row L1*b* ejects an orange ink. The nozzle row L2*a* ejects a red ink, and the nozzle row L2*b* ejects a green ink. The nozzle row L3*a* ejects a yellow ink, and the nozzle row L3*b* ejects a magenta ink. The nozzle row L4*a* ejects a black ink, and the nozzle row L4*b* ejects an overcoat liquid. Although not particularly illustrated, the head chip Hc that ejects the overcoat liquid may be disposed between the head chips Hc that eject the inks. Also in the present modification example, similarly to the first embodiment, the nozzle rows L1*a*, L1*b*, L2*a*, L2*b*, L3*a*, L3*b*, L4*a*, and L4*b* correspond to the "first nozzle row", and the head chips Hc1 to Hc4 having these nozzle rows correspond to the "first head chip". Each of the correspondence relationships of the "second nozzle row", the "third nozzle row", the "second head chip", and the "third head chip" in the present modification example is similar to that in the first embodiment.

Second Modification Example of First Embodiment

Table ta3 of FIG. 11 shows a second modification example that has the same configuration as the head unit U illustrated in FIG. 8, but the liquid to be ejected is changed. The head chips Hc5 and Hc6 in the second modification example have nozzle rows L5*a*, L5*b*, L6*a*, and L6*b* for ejecting the treatment liquid. The head chips Hc7 and Hc8 in the second modification example have nozzle rows L7*a*, L7*b*, L8*a*, and L8*b* for ejecting the reaction liquid. The nozzle rows L7*a*, L7*b*, L8*a*, and L8*b* for ejecting the reaction liquid correspond to the "second nozzle row", and the nozzle rows L5*a*, L5*b*, L6*a*, and L6*b* for ejecting the treatment liquid correspond to the "third nozzle row". The head chips Hc7 and Hc8 having the nozzle rows L7*a*, L7*b*, L8*a*, and L8*b* correspond to the "second head chip". The head chips Hc5 and Hc6 having the nozzle rows L5*a*, L5*b*, L6*a*, and L6*b* correspond to the "third head chip".

Third Modification Example of First Embodiment

Table ta4 of FIG. 12 shows a third modification example that has the same configuration as the head unit U illustrated in FIG. 8, but the liquid to be ejected is changed. The head chips Hc6 and Hc7 in the third modification example have nozzle rows L6*a*, L6*b*, L7*a*, and L7*b* for ejecting the reaction liquid. The head chips Hc5 and Hc8 in the third modification example have nozzle rows L5*a*, L5*b*, L8*a*, and L8*b* for ejecting the treatment liquid. The nozzle rows L6*a*, L6*b*, L7*a*, and L7*b* for ejecting the reaction liquid correspond to the "second nozzle row", and the nozzle rows L5*a*, L5*b*, L8*a*, and L8*b* for ejecting the treatment liquid correspond to the "third nozzle row". The head chips Hc6 and Hc7 having the nozzle rows L6*a*, L6*b*, L7*a*, and L7*b* correspond to the "second head chip". The head chips Hc5 and Hc8 having the nozzle rows L5*a*, L5*b*, L8*a*, and L8*b* correspond to the "third head chip".

Fourth Modification Example of First Embodiment

Table ta5 of FIG. 13 shows a fourth modification example that has the same configuration as the head unit U illustrated in FIG. 8, but the liquid to be ejected is changed. The head chips Hc6 and Hc7 in the fourth modification example have nozzle rows L6*a*, L6*b*, L7*a*, and L7*b* for ejecting the treatment liquid. The head chips Hc5 and Hc8 in the fourth modification example have nozzle rows La, L5*b*, L8*a*, and L8*b* for ejecting the reaction liquid. The nozzle rows L5*a*, L5*b*, L8*a*, and L8*b* for ejecting the reaction liquid correspond to the "second nozzle row", and the nozzle rows L6*a*, L6*b*, L7*a*, and L7*b* for ejecting the treatment liquid correspond to the "third nozzle row". The head chips Hc5 and Hc8 having the nozzle rows L5*a*, L5*b*, L8*a*, and L8*b* correspond to the "second head chip". The head chips Hc6 and Hc7 having the nozzle rows L6*a*, L6*b*, L7*a*, and L7*b* correspond to the "third head chip".

Fifth Modification Example of First Embodiment

Table ta6 of FIG. 14 shows a fifth modification example that has the same configuration as the head unit U illustrated in FIG. 8, but the liquid to be ejected is changed. The head chip Hc5 in the fifth modification example has nozzle rows L5*a* and L5*b* for ejecting the reaction liquid. The head chip Hc8 in the fifth modification example has nozzle rows L8*a* and L8*b* for ejecting the treatment liquid. The head chips Hc6 and Hc7 in the fifth modification example have unused nozzle rows L6*a*, L6*b*, L7*a*, and L7*b* for ejecting no liquid. The nozzle rows L5*a* and L5*b* for ejecting the reaction liquid correspond to the "second nozzle row", and the nozzle rows L8*a* and L8*b* for ejecting the treatment liquid correspond to the "third nozzle row". The head chip Hc5 having the nozzle rows L5*a* and L5*b* corresponds to the "second head chip". The head chip Hc8 having the nozzle rows L8*a* and L8*b* corresponds to the "third head chip".

Sixth Modification Example of First Embodiment

Table ta7 of FIG. 15 shows a sixth modification example that has the same configuration as the head unit U illustrated in FIG. 8, but the liquid to be ejected is changed. The head chip Hc7 in the sixth modification example has nozzle rows La and L7*b* for ejecting the reaction liquid. The head chip Hc6 in the sixth modification example has nozzle rows L6*a* and L6*b* for ejecting the treatment liquid. The head chips Hc5 and Hc8 in the sixth modification example have unused nozzle rows L5*a*, L5*b*, L8*a*, and L8*b* for ejecting no liquid. The nozzle rows L7*a* and L7*b* for ejecting the reaction liquid correspond to the "second nozzle row", and the nozzle rows *Loa* and L6*b* for ejecting the treatment liquid correspond to the "third nozzle row". The head chip Hc7 having the nozzle rows L7*a* and L7*b* corresponds to the "second head chip". The head chip Hc6 having the nozzle rows L6*a* and L6*b* corresponds to the "third head chip". Although not particularly illustrated, the nozzle rows *Loa* and L6*b* may be caused to eject the reaction liquid, and the nozzle rows La and L7*b* may be caused to eject the treatment liquid. In this case, the nozzle rows L6*a* and L6*b* correspond to the "second nozzle row", the nozzle rows L7*a* and L7*b* correspond to the "third nozzle row", the head chip Hc6 corresponds to the "second head chip", and the head chip Hc7 corresponds to the "third head chip".

The correspondence relationships of the "first nozzle row" and the "first head chip" in each of the second to sixth modification examples of the first embodiment are similar to those in the first embodiment.

First Comparative Example of First Embodiment

Table ta8 of FIG. 16 shows a first comparative example that has the same configuration as the head unit U illustrated in FIG. 8, but the liquid to be ejected is changed. The head chip Hc5 in the first comparative example has a nozzle row L5*a* for ejecting the reaction liquid and a nozzle row L5*b* for ejecting the treatment liquid. The head chip Hc8 in the first comparative example has a nozzle row L8*a* for ejecting the treatment liquid and a nozzle row L8*b* for ejecting the reaction liquid. In the example of FIG. 16, the head chip Hc5 disposed at the end of the liquid ejecting head H2 in the +Y direction ejects the reaction liquid from the nozzle row L5*a* and ejects the treatment liquid from the nozzle row L5*b*. The head chip Hc8 disposed at the end of the liquid ejecting head H2 in the −Y direction ejects the treatment liquid from the nozzle row L8*a* and ejects the reaction liquid from the nozzle row L8*b*. As described above, there is a concern that the nozzle row L for ejecting the treatment liquid may be clogged by the mist of the reaction liquid ejected from the immediately adjacent nozzle row L.

Second Comparative Example of First Embodiment

Table ta9 of FIG. 17 shows a second comparative example that has the same configuration as the head unit U illustrated in FIG. 8, but the liquid to be ejected is changed. The head chip Hc1 in the second comparative example has nozzle rows L1*a* and L1*b* for ejecting the treatment liquid. The head chip Hc2 in the second comparative example has a nozzle row L2*a* for ejecting the overcoat liquid and a nozzle row L2*b* for ejecting the cyan ink. The head chips Hc3, Hc4, and Hc5 have nozzle rows L3*a*, L3*b*, L4*a*, L4*b*, L5*a*, and L5*b* for ejecting color inks shown in Table ta9. The head chips Hc6 and Hc7 have unused nozzle rows L6*a*, L6*b*, La, and L7*b* for ejecting no liquid. The head chip Hc8 has nozzle rows L8*a* and L8*b* for ejecting the reaction liquid. In the second comparative example, the head chip Hc5 having the nozzle rows L5*a* and L5*b* for ejecting the inks and the head chip Hc8 having the nozzle rows L8*a* and L8*b* for ejecting the reaction liquid are disposed in the same liquid ejecting head H2. In the head unit U in such a second comparative example, there is a concern that the nozzle 21 of the head chip Hc5 is clogged by the mist of the reaction liquid ejected from the head chip Hc8.

Third Comparative Example of First Embodiment

Although not particularly illustrated, a head unit including the liquid ejecting head H1, the liquid ejecting head H2 including only the head chip Hc having a nozzle row for ejecting the treatment liquid, and the liquid ejecting head H3 including only the head chip Hc having a nozzle row for ejecting the reaction liquid is assumed as a third comparative example. In such a third comparative example, the head chip Hc that ejects the treatment liquid and the head chip Hc that ejects the reaction liquid are respectively disposed in the separate liquid ejecting head H2 and the liquid ejecting head H3. In the head unit U having such a configuration, the number of liquid ejecting heads increases, and the sizes of the head unit U and the liquid ejecting apparatus 1 increase.

Second Embodiment

Figure 18:
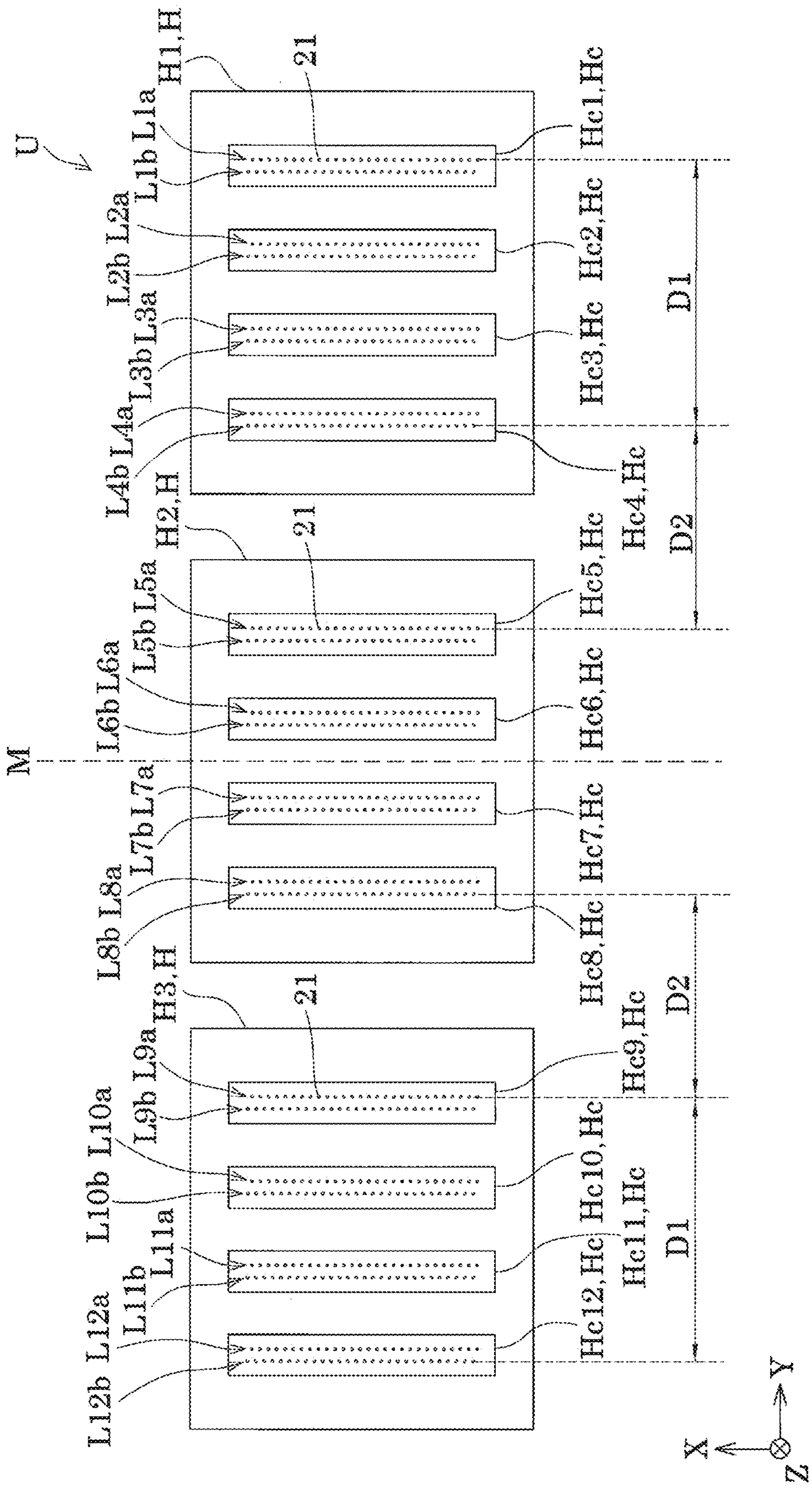
FIG. 18 is a plan view of a head unit according to a second embodiment of the present disclosure.

A head unit U according to a second embodiment will be described with reference to FIGS. 18 and 19. FIG. 18 is a plan view of the head unit U. FIG. 19 is a table showing the relationship between each nozzle row L and the liquid to be ejected. FIG. 18 illustrates only a liquid ejecting head H, a head chip Hc, and a nozzle row L of the head unit U, and does not illustrate other members such as a support U1. The same components as those in the first embodiment are designated by the same reference signs, and the repetitive descriptions will be omitted.

In the present embodiment, a plurality of liquid ejecting heads H include three liquid ejecting heads H arranged along the Y-axis direction. Specifically, a liquid ejecting head H1, a liquid ejecting head H2, and a liquid ejecting head H3 are disposed in this order in the −Y direction.

The liquid ejecting head H3 includes a plurality of head chips Hc. In the present embodiment, the liquid ejecting head H3 includes four head chips Hc. The four head chips Hc are arranged side by side along the Y-axis direction to be located at the same position in the X-axis direction. The four head chips Hc are referred to as head chips Hc9 to Hc12 in the −Y direction in this order.

The nozzle rows La and Lb of the head chip Hc9 are referred to as nozzle rows L9*a* and L9*b*. The nozzle rows La and Lb of the head chip Hc10 are referred to as nozzle rows L10*a* and L10*b*. The nozzle rows La and Lb of the head chip Hc11 are referred to as nozzle rows L11*a* and L11*b*. The nozzle rows La and Lb of the head chip Hc12 are referred to as nozzle rows L12*a* and L12*b*. That is, in the liquid ejecting head H3, eight nozzle rows L9*a*, L9*b*, L10*a*, L10*b*, L1*a*, L11*b*, L12*a*, and L12*b* are disposed to be arranged in the −Y direction in this order.

As shown in Table ta10 of FIG. 19, the nozzle row L9*a* ejects a black ink and the nozzle row L9*b* ejects a magenta ink. The nozzle row L10*a* ejects a yellow ink, and the nozzle row L10*b* ejects a green ink. The nozzle row L11*a* ejects a red ink, and the nozzle row L11*b* ejects an orange ink. The nozzle row L12*a* ejects a cyan ink, and the nozzle row L12*b* ejects an overcoat liquid.

As described above, the liquid ejecting head H3 includes the head chips Hc9 to Hc11 having the nozzle rows L9*b*, L9*a*, L10*b*, L10*a*, L11*b*, and L11*a* for ejecting the inks, and the head chip Hc12 having a nozzle row L12*a* for ejecting the ink and a nozzle row L12*b* for ejecting the overcoat liquid.

The configuration of the liquid ejecting head H1 is similar to that of the first embodiment. The liquid ejecting head H2 is disposed between the liquid ejecting head H1 and the liquid ejecting head H3, and the configuration of the head chip Hc is similar to that of the third modification example of the first embodiment. That is, the liquid ejecting head H2 includes head chips Hc5 and Hc8 having nozzle rows L5*a*, L5*b*, L8*a*, and L8*b* for ejecting the treatment liquid and head chips Hc6 and Hc7 having nozzle rows L6*a*, L6*b*, L7*a*, and L7*b* for ejecting the reaction liquid.

A plurality of nozzle rows L in the liquid ejecting head H1 and a plurality of nozzle rows L in the liquid ejecting head H3 are disposed to be line-symmetrical with respect to a symmetry axis M perpendicular to the Y-axis direction. A plurality of nozzle rows L2 in the liquid ejecting head H2 and a plurality of nozzle rows L3 in the liquid ejecting head H2 are disposed to be line-symmetrical with respect to the symmetry axis M.

Specifically, as shown in Table ta10 of FIG. 19, in the liquid ejecting head H1, the respective nozzle rows L are disposed from the +Y direction to the −Y direction to eject an overcoat liquid, a cyan ink, an orange ink, a red ink, a green ink, a yellow ink, a magenta ink, and a black ink. On the other hand, in the liquid ejecting head H3, the respective nozzle rows L are disposed from the −Y direction to the +Y direction to eject the overcoat liquid, the cyan ink, the orange ink, the red ink, the green ink, the yellow ink, the magenta ink, and the black ink. As described above, the first nozzle row L1*a* of the liquid ejecting head H1 from the +Y direction ejects the overcoat liquid, and the first nozzle row L12*b* of the liquid ejecting head H3 from the −Y direction ejects the overcoat liquid. Similarly, the second nozzle rows L1*b* and L12*a* eject the cyan ink, and the third nozzle rows L2*a* and 11*b* eject the orange ink. The same liquids are ejected for the subsequent sets of nozzle rows in a similar manner. As described above, the liquids ejected from the respective nozzle rows L are symmetrical to each other with respect to the symmetry axis M. The same applies to the liquid ejecting head H2. Specifically, the first nozzle row L5*a* from the +Y direction and the first nozzle row L8*b* from the −Y direction eject the treatment liquid. The same applies to the second and subsequent nozzles, and the liquids ejected from the respective nozzle rows L of the liquid ejecting head H2 are symmetrical to each other with respect to the symmetry axis M.

In the liquid ejecting head H2, the head chips Hc6 and Hc7 that eject the reaction liquid are disposed between the head chip Hc5 and the head chip Hc8 that eject the treatment liquid. The present embodiment is not limited to such a disposition. The head chips Hc6 and Hc7 that eject the treatment liquid may be disposed between the head chip Hc5 and the head chip Hc8 that eject the reaction liquid.

A first distance D1 in the liquid ejecting head H3 is defined as described in the first embodiment. That is, the first distance D1 is a distance between two nozzle rows L disposed at both ends in the Y-axis direction among a plurality of nozzle rows L in the liquid ejecting head H3. Specifically, a distance in the +Y direction between the nozzle row L9*a* disposed at the end in the +Y direction and the nozzle row L12*b* disposed at the end in the −Y direction among the plurality of nozzle rows L in the liquid ejecting head H3 is the first distance D1 in the liquid ejecting head H3. In the present embodiment, the first distance D1 in the liquid ejecting head H1 and the first distance D1 in the liquid ejecting head H3 are the same as each other, but may be different from each other.

A second distance D2 between the liquid ejecting head H3 and the liquid ejecting head H2 is defined as described in the first embodiment. That is, the second distance D2 is a distance in the +Y direction between the nozzle row L9*a* and the nozzle row L8*b*. The nozzle row L9*a* is closest to the liquid ejecting head H2 among a plurality of nozzle rows L in the liquid ejecting head H3. The nozzle row L8*b* is closest to the liquid ejecting head H3 among a plurality of nozzle rows L in the liquid ejecting head H2. In the present embodiment, the second distance D2 between the liquid ejecting head H1 and the liquid ejecting head H2 and the second distance D2 between the liquid ejecting head H3 and the liquid ejecting head H2 are the same as each other, but may be different from each other. A third distance D3, a fourth distance D4, and a fifth distance D5 in the liquid ejecting head H2 are the same as those in the first embodiment, and are not illustrated.

The head unit U having such a configuration can form an image by bidirectional printing. Specifically, the moving process of a medium S is executed every time the +Y direction printing process and the −Y direction printing process are executed three times.

In the first +Y direction printing process and −Y direction printing process, while the head unit U moves in the +Y direction, the liquid ejecting head H1 ejects the ink of each color except for the overcoat liquid, and the nozzle rows L6*a* and L6*b* of the head chip Hc6 in the liquid ejecting head H2 eject the reaction liquid. While the head unit U moves in the −Y direction, the liquid ejecting head H3 ejects the ink of each color except for the overcoat liquid, and the nozzle rows La and L7*b* of the head chip Hc7 in the liquid ejecting head H2 eject the reaction liquid.

In the second +Y direction printing process and −Y direction printing process, while the head unit U moves in the +Y direction, the nozzle row L1*a* of the liquid ejecting head H1 ejects the overcoat liquid. Then, while the head unit U moves in the −Y direction, the nozzle row L12*b* of the liquid ejecting head H3 ejects the overcoat liquid.

In the third +Y direction printing process and −Y direction printing process, while the head unit U moves in the +Y direction, the nozzle rows L5*a* and L5*b* of the head chip Hc5 in the liquid ejecting head H2 eject the treatment liquid. Then, while the head unit U moves in the −Y direction, the nozzle rows L8*a* and L8*b* of the head chip Hc7 in the liquid ejecting head H2 eject the treatment liquid.

After such a printing process is ended, the medium S is moved toward the X-axis direction. In such bidirectional printing, the ink, the reaction liquid, the overcoat liquid, and the treatment liquid are ejected in this order to a region corresponding to one band width of the medium S, whereby a partial image is formed.

In the head unit U described above, the plurality of liquid ejecting heads H include the liquid ejecting head H3 having the plurality of head chips Hc. The liquid ejecting head H2 is disposed between the liquid ejecting head H1 and the liquid ejecting head H3. The plurality of nozzle rows L in the liquid ejecting head H1 and the plurality of nozzle rows L in the liquid ejecting head H3 are disposed to be line-symmetrical with respect to the symmetry axis M perpendicular to the Y-axis direction.

According to the head unit U having such a configuration, the similar actions and effects to those of the first embodiment can be obtained. Furthermore, regardless of the head unit U moving in the +Y direction and in the −Y direction, the reaction liquid, the ejection order of the respective colors of the inks containing coloring materials, the overcoat liquid, and the treatment liquid can be similarly set to the same order. Therefore, when the head unit U performs printing by reciprocating in the Y-axis direction, the order of moving in the +Y direction and ejecting the liquid and the order of moving in the −Y direction and ejecting the liquid can be set to be the same. Thus, it is possible to set the overlapping order of the liquids on the medium S to be the same, and to set a difference of time of landing the liquid between different types of liquids to be the same. Therefore, it is possible to suppress the difference in the color due to the difference in a scanning direction and the difference in the degree of aggregation of the ink due to the difference in the scanning direction, and to improve the printing quality.

The plurality of nozzle rows L6*a*, L6*b*, L7*a*, and L7*b* for ejecting the reaction liquid, which are included in the liquid ejecting head H2, and the plurality of nozzle rows L5*a*, L5*b*, L8*a*, and L8*b* for ejecting the treatment liquid, which are included in the liquid ejecting head H2, are disposed to be line-symmetrical with respect to the symmetry axis M. The plurality of nozzle rows L6*a*, L6*b*, L7*a*, and L7*b* in the liquid ejecting head H2 are disposed between the plurality of nozzle rows L5*a*, L5*b*, L8*a*, and L8*b* in the liquid ejecting head H2. That is, in the case of the head unit U having a symmetrical disposition, the nozzle rows L6*a*, L6*b*, L7*a*, and L7*b* for ejecting the reaction liquid are disposed on an inner side of the nozzle rows La, L5*b*, L8*a*, and L8*b*. As compared to a case where the nozzle row L for ejecting the reaction liquid is disposed on an outer side of the nozzle row L for ejecting the treatment liquid, in such a head unit U, it is possible to separate the nozzle rows L6*a*, L6*b*, L7*a*, and L7*b* for ejecting the reaction liquid from the liquid ejecting head H1 and the liquid ejecting head H3. Thus, it is possible to reduce the risk that the mist of the reaction liquid reacts with the ink or the overcoat liquid in the nozzles 21 of the liquid ejecting head H1 and the liquid ejecting head H3, and thus the mist aggregates with the ink or the overcoat liquid, and the nozzle 21 is clogged.

The liquid ejecting head H3 corresponds to a "third head". The head chips Hc1 and Hc12 that eject the ink and the overcoat liquid and the head chips Hc2 to Hc4 and Hc9 to Hc11 that eject the inks correspond to the "first head chip". The head chips Hc6 and Hc7 correspond to the "second head chip". The head chips Hc5 and Hc8 correspond to the "third head chip". The nozzle rows L1*a* and L12*b* for ejecting the overcoat liquid and the nozzle rows L1*b*, L2*a*, L2*b*, L3*a*, L3*b*, L4*a*, and L4*b*, L9*a*, L9*b*, L10*a*, L10*b*, L11*a*, L11*b*, and L12*a* for ejecting the inks correspond to the "first nozzle row". The nozzle rows L6*a*, L6*b*, L7*a*, and L7*b* for ejecting the reaction liquid correspond to the "second nozzle row". The nozzle rows La, L5*b*, L8*a*, and L8*b* for ejecting the treatment liquid correspond to the "third nozzle row".

Other Embodiments

In the above-described embodiments, an ink jet recording head is described as an example of a liquid ejecting head. However, the present disclosure is intended for a wide range of liquid ejecting heads, and can also be applied to a liquid ejecting head that discharges a liquid other than ink. Other liquid ejecting heads include, for example, various recording heads used in image recording apparatuses such as printers, coloring material ejecting heads used in manufacturing color filters such as liquid crystal displays, electrode material ejecting heads used for electrode formation such as organic EL displays and field emission displays (FEDs), and bioorganic substance ejecting heads used for bio-chip manufacturing, and the present disclosure can also be applied to liquid ejecting apparatuses including such liquid ejecting heads.

In the above-described embodiments, the piezoelectric actuator is described as a driving element that causes the pressure change in the pressure chamber, but the present disclosure is not particularly limited thereto. For example, as the driving element, an element in which a heat generating element is disposed in the pressure chamber to discharge the ink droplets from the nozzle by bubbles generated due to the heat of the heat generating element, or a so-called electrostatic actuator that generates static electricity between a diaphragm and an electrode, deforms the diaphragm by the electrostatic force, and discharges the ink droplets from the nozzle can be used.

The present disclosure is not limited to the above embodiments. It is clear to those skilled in the art that the followings are disclosed as the embodiments of the present disclosure.

- Members, configurations, and the like that are disclosed in the embodiments and are mutually replaceable are changed to combinations thereof and the combinations are applied.
- Although not disclosed in the examples, members, configurations, and the like that are mutually replaceable with the members, the configurations, and the like disclosed in the embodiments, which are the known technology, are appropriately replaced, and combinations thereof are changed and applied.
- Although not disclosed in the embodiments, members, configurations, and the like that may be assumed as replacements for the members, the configurations, and the like disclosed in the embodiments based on the known technology and the like by those skilled in the art are appropriately replaced, and combinations thereof are changed and applied.

Supplementary Notes

From the embodiments exemplified above, for example, the following configuration can be ascertained.

According to Aspect 1 that is a preferred aspect, there is provided a liquid ejecting head that ejects a first liquid, a reaction liquid that aggregates the first liquid, and a treatment liquid that is less likely to aggregate with the reaction liquid than the first liquid, in which the head unit includes a plurality of liquid ejecting heads disposed to be arranged in a first direction, each of the plurality of liquid ejecting heads includes a plurality of head chips having one or more nozzle rows, a first distance is a distance in the first direction between a nozzle row disposed at an end in the first direction and a nozzle row disposed at an end in a second direction opposite to the first direction among a plurality of the nozzle rows in the liquid ejecting head, the plurality of liquid ejecting heads include a first head and a second head adjacent to each other, a second distance in the first direction between a nozzle row closest to the second head among a plurality of the nozzle rows in the first head and a nozzle row closest to the first head among a plurality of the nozzle rows in the second head is longer than the first distance, the first head includes a plurality of first head chips having one or more first nozzle rows for ejecting the first liquid, and the second head includes one or more second head chips having one or more second nozzle rows for ejecting the reaction liquid and one or more third head chips having one or more third nozzle rows for ejecting the treatment liquid.

In Aspect 2 that is a specific example of Aspect 1, the first head is disposed in the first direction with respect to the second head, and the second head chip of the second head is disposed in the second direction with respect to the third head chip of the second head.

In Aspect 3 that is a specific example of Aspect 2, the second head is a liquid ejecting head disposed at an end in the second direction among the plurality of liquid ejecting heads.

In Aspect 4 that is a specific example of Aspect 3, the second head chip of the second head is a head chip disposed at the end in the second direction among a plurality of head chips in the second head, and the third head chip of the second head is a head chip disposed at the end in the first direction among the plurality of the head chips in the second head.

In Aspect 5 that is a specific example of Aspect 1, a third distance is a distance in the first direction between nozzle rows adjacent to each other among a plurality of the nozzle rows in the head chip, a fourth distance is a distance in the first direction between a nozzle row closest to one head chip among a plurality of the nozzle rows in another head chip and a nozzle row closest to the other head chip among a plurality of the nozzle rows in the one head chip in two adjacent head chips among the plurality of head chips in the liquid ejecting head, the fourth distance is longer than the third distance, and the second nozzle row of the second head and the third nozzle row of the second head are not disposed at the same head chip among a plurality of the head chips in the second head.

In Aspect 6 that is a specific example of Aspect 5, a shortest fifth distance in the first direction between the second nozzle row of the second head and the third nozzle row of the second head is longer than the fourth distance.

In Aspect 7 that is a specific example of Aspect 1, a plurality of the head chips in the second head include a dummy head chip that is disposed between the second head chip of the second head and the third head chip of the second head in the first direction and ejects no liquid.

In Aspect 8 that is a specific example of Aspect 1, the plurality of liquid ejecting heads include a third head having a plurality of the first head chips, the second head is disposed between the first head and the third head, and a plurality of the first nozzle rows in the first head and a plurality of the first nozzle rows in the third head are disposed to be line-symmetrical with respect to a symmetry axis perpendicular to the first direction.

In Aspect 9 that is a specific example of Aspect 8, a plurality of the second nozzle rows in the second head and a plurality of the third nozzle rows in the second head are disposed to be line-symmetrical with respect to the symmetry axis, and the plurality of second nozzle rows in the second head are disposed between the plurality of third nozzle rows in the second head.

In Aspect 10 that is a specific example of Aspect 1, the second head does not include the first head chip.

In Aspect 11 that is a specific example of Aspect 1, the second distance is smaller than a dimension of the liquid ejecting head in the first direction.

In Aspect 12 that is a specific example of Aspect 1, the treatment liquid is a liquid containing a softening agent.

According to Aspect 13 that is another preferred aspect, a liquid ejecting apparatus includes the head unit according to the above aspects, and a moving mechanism that reciprocates the head unit in the first direction and the second direction.

What is claimed is:

1. A head unit configured to eject a first liquid, a reaction liquid that aggregates the first liquid, and a treatment liquid that is less likely to aggregate with the reaction liquid than the first liquid, the head unit comprising:

a plurality of liquid ejecting heads disposed to be arranged in a first direction, wherein each of the plurality of liquid ejecting heads includes a plurality of head chips having one or more nozzle rows, a first distance is a distance in the first direction between a nozzle row disposed at an end in the first direction and a nozzle row disposed at an end in a second direction opposite to the first direction among a plurality of the nozzle rows in the liquid ejecting head, the plurality of liquid ejecting heads include a first head and a second head adjacent to each other, a second distance in the first direction between a nozzle row closest to the second head among a plurality of the nozzle rows in the first head and a nozzle row closest to the first head among a plurality of the nozzle rows in the second head is longer than the first distance, the first head includes a plurality of first head chips having one or more first nozzle rows for ejecting the first liquid, and the second head includes one or more second head chips having one or more second nozzle rows for ejecting the reaction liquid and one or more third head chips having one or more third nozzle rows for ejecting the treatment liquid.

2. The head unit according to claim 1, wherein the first head is disposed in the first direction with respect to the second head, and the second head chip of the second head is disposed in the second direction with respect to the third head chip of the second head.

3. The head unit according to claim 2, wherein the second head is a liquid ejecting head disposed at the end in the second direction among the plurality of liquid ejecting heads.

4. The head unit according to claim 3, wherein the second head chip of the second head is a head chip disposed at the end in the second direction among a plurality of the head chips in the second head, and the third head chip of the second head is a head chip disposed at the end in the first direction among the plurality of the head chips in the second head.

5. The head unit according to claim 1, wherein a third distance is a distance in the first direction between nozzle rows adjacent to each other among a plurality of the nozzle rows in the head chip, a fourth distance is a distance in the first direction between a nozzle row closest to one head chip among a plurality of the nozzle rows in another head chip and a nozzle row closest to the other head chip among a plurality of the nozzle rows in the one head chip in two adjacent head chips among the plurality of head chips in the liquid ejecting head, the fourth distance is longer than the third distance, and the second nozzle row of the second head and the third nozzle row of the second head are not disposed at the same head chip among a plurality of the head chips in the second head.

6. The head unit according to claim 5, wherein a shortest fifth distance in the first direction between the second nozzle row of the second head and the third nozzle row of the second head is longer than the fourth distance.

7. The head unit according to claim 1, wherein a plurality of the head chips in the second head include a dummy head chip that is disposed between the second head chip of the second head and the third head chip of the second head in the first direction and ejects no liquid.

8. The head unit according to claim 1, wherein the plurality of liquid ejecting heads include a third head having a plurality of the first head chips, the second head is disposed between the first head and the third head, and a plurality of the first nozzle rows in the first head and a plurality of the first nozzle rows in the third head are disposed to be line-symmetrical with respect to a symmetry axis perpendicular to the first direction.

9. The head unit according to claim 8, wherein a plurality of the second nozzle rows in the second head and a plurality of the third nozzle rows in the second head are disposed to be line-symmetrical with respect to the symmetry axis, and the plurality of second nozzle rows in the second head are disposed between the plurality of third nozzle rows in the second head.

10. The head unit according to claim 1, wherein the second head does not include the first head chip.

11. The head unit according to claim 1, wherein the second distance is smaller than a dimension of the liquid ejecting head in the first direction.

12. The head unit according to claim 1, wherein the treatment liquid is a liquid containing a softening agent.

13. A liquid ejecting apparatus comprising:

the head unit according to claim 1; and a moving mechanism that reciprocates the head unit in the first direction and the second direction.

* * * * *